United States Patent [19]
Ramakrishna

[11] Patent Number: 5,390,286
[45] Date of Patent: Feb. 14, 1995

[54] RETICULAR DISCRIMINATION NETWORK FOR SPECIFYING REAL-TIME CONDITIONS

[75] Inventor: Kamesh Ramakrishna, Milford, Mass.

[73] Assignee: Digital Equipment Corporation, Maynard, Mass.

[21] Appl. No.: 499,039

[22] Filed: Mar. 26, 1990

[51] Int. Cl.⁶ ............................................. G06F 15/18
[52] U.S. Cl. .................................................... 395/64
[58] Field of Search ........................... 364/513; 395/64

[56] References Cited

U.S. PATENT DOCUMENTS

| | | | |
|---|---|---|---|
| 4,761,746 | 8/1988 | Tano et al. | 364/513 |
| 4,779,208 | 10/1988 | Tsuruta et al. | 364/513 |
| 4,837,735 | 6/1989 | Allen, Jr. et al. | 364/513 |
| 4,849,905 | 7/1989 | Loeb et al. | 364/513 |

OTHER PUBLICATIONS

Schor et al., "Advances in Rete Pattern Matching", *Proceedings of 1986 American Association For Artificial Intelligence Conferece*, pp. 226–232.
Sorrels, "A Time-Constrained Inference Strategy for Real Time Expert Systems", Porc. IEEE 1985 National Aerospace and Electronics Conf. pp. 1336–1341.
Faulk & Parnas, "On Synchronization in Hard-Real-Time Systems," Communications of the ACM, vol. 31, No. 3, Mar. 1988.
Forgy, *On the Efficient Implementation of Production Systems*, Carnegie-Mellon University, Ph.D., 1979.
Hillis & Steele, "Data Parallel Algorithms", Communications of the ACM, vol. 29, No. 12, Dec. 1986.

*Primary Examiner*—Allen R. MacDonald
*Assistant Examiner*—Robert W. Downs

[57] ABSTRACT

A reticular discrimination net utilized in expert systems is adapted to accommodate responses only to critical changes in data by utilizing @T and @F clauses which describe changing conditions. By placing these mechanisms into a traditional reticular discrimination net as test nodes and configuring the mechanisms to function as traditional test nodes, the computation and interaction among data elements is minimized. This also enables the network to keep track of the state of the match process, thus allowing the network to respond only to critical changes in data.

9 Claims, 12 Drawing Sheets

RETICULAR DISCRIMINATION NETWORK FOR SPECIFYING REAL-TIME CONDITIONS

FIELD OF THE INVENTION

This invention relates to a rule-based programmed computer system, and more particularly, to a knowledge-based computer system utilizing a reticular discrimination network that is suitable for specifying real-time conditions by only responding to critical data changes.

BACKGROUND OF THE INVENTION

Knowledge-based or artificial intelligence (hereinafter "AI") computer systems seek to solve problems utilizing computer technology in a manner that would be considered intelligent if performed by a human. In particular, AI computer systems focus on generalized knowledge-representation and search techniques for specialized programs. Knowledge representation involves formulating a problem in a way so that it can be solved. Search techniques involve the ways to efficiently navigate through the knowledge base, i.e., the area of memory where the knowledge is stored, to minimize computation time and memory requirements.

Many of the application systems created with a rule-Express based computer system model are known as expert systems. An expert system is a specialized computer program designed to exhibit the same level of skills as an expert in a specific domain. Expert systems differ from conventional computer systems in that they operate on numeric and symbolic data whereas conventional programs focus on numbers. Expert systems contain explicit knowledge about the domain in which they operate whereas such knowledge is implicit in a program's algorithm in conventional computer systems. Expert systems contain uncertain or inexact relationships, i.e., heuristics, that allow the system to make deductions that are usually correct. Expert systems are coded to contain facts and relationships that are declared explicitly, thus enabling a nonprogrammer to read and understand the knowledge code in the system. Thus, expert systems automate the application of knowledge just as conventional computers automate the application of arithmetic to data processing.

The components of a rule-based expert system are a data store, i.e., the data, a set of production rules, i.e., the program, and an inference engine, i.e., the executor. The data store serves as a global database of symbols representing facts concerning the problem. The set of production rules comprises the program. These rules can be stored in production or rule memory. The inference engine is utilized to fire, i.e., execute, the rules. The inference engine determines which rules are relevant to a given data memory configuration and chooses one or more for execution.

Each rule comprising the set of production rules can have a condition part that describes the data configuration for which the rule is appropriate, commonly referred to as the "left-hand side" and an action part that gives instructions for changing the data configuration, commonly referred to as the "right-hand side". The rules are expressions of conditions that represent empirical associations between patterns of data presented to expert systems and actions that the systems should perform as a consequence. An example of a rule using the rule structure of the OPS5 production-system language is set forth below. For a complete description of OPS5, reference should be made to Brownston et al., *Programming Expert Systems in OPS5*, (Addison-Wesley Publishing Co., 1985).

```
(P Rule-Example
    (patient-data   AGE $A
                    HEIGHT ($B < $A)
                    NAME $N)
    (monitor-data   NAME $N
                    PULSE ($C > $B))
    --->
    (Write "Patient "$N" is in critical
    condition")
)
```

The left-hand side of the rule is represented by two data structures. The first data structure "patient-data" has attributes "AGE" "HEIGHT" and "NAME" that are represented by the variables "$A" "$B" and "$N" respectively. These variables refer to the attributes of a specific patiênt. The second data structure "monitor-data" has attributes "NAME" and "PULSE" represented by the variables "$N" and "$C", respectively, and also refer to attributes for the same patient referred to in the first data structure. The left-hand side of the above ruleis satisfied when the name attribute has the same value in the patient-data and monitor-data data structure, the patient's height is greater than the patient's age and the patient's pulse rate is greater than the patient's height. If it is determined that the left-hand side of the rule is satisfied, then the right-hand side of the rule can be executed, i.e., the message "Patient "$N" is in critical condition" is written to a printer or a video display terminal.

To avoid testing or retesting every condition in the left-hand side of all the rules each time a new data element is presented to the system, some rule-based expert systems structure the left-hand side of the rules as a "discrimination network" such as a "reticular" network or RETE-net. A RETE-net, with its associated inference engine, will minimize the repetition of tests that have been performed before or that will be performed on subsequent cycles. The RETE-net shares the results of tests among all rules where possible. The RETE-net determines which rules are applicable by only testing those conditions having results that may change in response to a new data element. Also, in a single processor configuration, RETE-nets test conditions that are common to more than one rule only once each time the database changes. Thus, in a single processor configuration, new data is only tested against the successful results of the tests for the old data.

A RETE-net is a data structure that arranges the conditions of all rules as a network of nodes. The patterns which occur in the left-hand side of rules are compiled using known techniques into a network of nodes which test working memory elements for the requisite conditions. To accomplish this, each one of the conditions of the rules is translated into a sequence of tests corresponding to different attributes required by the conditions. Each test of one of the conditions pertaining to a single memory element in the left-hand side of the rule, i.e., A<3, is represented by a one-input node referred to as a "test node". A condition is represented by a single test node even if that condition occurs in the left-hand side of multiple rules. A test pertaining to multiple data elements represented by a chain of test nodes representing a condition, i.e., (A<B) AND (B<C), is joined to the network structure for the preceding part of the rule by a two-input node referred to as a "join node". Each join node corresponds to a logical connector in a rule.

Join nodes maintain lists that record the set of working memory elements received by the node in memory associated with each input of the join node. Join nodes include a pair of memories, one for each of the nodes from which the join nodes receive working memory elements in the form of tokens. These memories are refer to as "beta memory" i.e. the memory associated with an input of the node coupled to a test node representative of a test condition in a rule to the left of the logical connector represented by the join node, and "alpha memory" i.e. the memory associated with an input of the node coupled to a test node representative of a test condition in a rule to the right of the logical connector represented by the join node. The join node may also include tests, e.g., logical AND, which further represent the conditions of the rules. Following the join node may be other join nodes or a node referred to as a terminal node. The terminal node represents the particular rule for the sequence of tests representative of the conditions above coupled to the terminal node.

Typical rule-based expert systems will include a number of rules. A RETE-net in such expert system will have a plurality of test nodes, one for each condition in the rules, so that if the same condition appears in multiple rules, the RETE-net requires only one test node to represent the condition. In addition, join nodes may be shared among rules if the same series of preceding join nodes and test conditions are used in multiple rules.

When working memory elements are added or deleted, they are propagated through the RETE-net in the form of tokens that resemble working memory elements or sequences of working memory elements. The tokens are tagged with a + or − to indicate whether the element or element sequence is being added or deleted. The first step in propagating a working memory element is to pass the token to each test node where each node applies its test. If the test is successful, the node passes a primitive token representative of the working memory element to the successors of the node. If a test is not successful, the match fails and the token is not propagated for further processing. This sequence of passing and testing the token continues until the token reaches a terminal node indicating that the left-hand side of a rule is satisfied and, therefore, a rule is ready to be fired, i.e., executed. The firing of a rule results in the right-hand side of the rule being executed, e.g., the message "Patient "$N" is in critical condition" is written to a printer or a video display terminal.

A rule is ready to be fired once a token has been stored in its corresponding terminal node. Since there may be a plurality of rules, the expert system must follow some procedure for selecting the order for firing rules. This process is referred to as conflict resolution. Conflict resolution must select the order for firing rules because the firing of rules may result in changes to the state of the RETE-net. These changes may cause other rules to be satisfied or satisfied rules to become false. The expert system may utilize conflict resolution to fire all the rules ready to be fired and then reevaluate the RETE-net to ascertain the consequences of the rule firings or conflict resolution may arrange the sequence of firing to depend upon information passed to the expert system.

Traditionally, RETE-nets have not been applied to systems that process real-time data. A real-time system either guarantees a response to a change in critical data within a specific time period, i.e., a hard-real-time system, or simply guarantees a fast response. If there is a change in data, the real-time system must respond to the change by evoking, i.e., starting, a program that processes the data within a certain time period. Often real-time systems will quickly test data to determine if the change is "critical" and will continue with complex processing only in that case. One problem RETE-nets have with real-time data is that it is difficult to predict the amount of time that elapses between the time data is received at the input node of a RETE-net and when a terminal node is ready to fire. Also, RETE-nets respond to any change in data not only "critical" changes in data.

The difficulties set forth above are attributed to the test performed in a join node. A prediction cannot be made as to how long such test will take because the received token must be matched, i.e., compared, to the tokens stored in memory for the join node to ascertain if any matches are found. The number of entries in the join node memory is unknown. Thus, the amount of time required to perform the test with all the stored tokens is unknown. Also, a join node is not designed to only respond to critical data changes. A join node will generate a token if a matched pair of tokens is found regardless of whether the token received represents a change from a noncritical to a critical state or not.

Based on the foregoing, the structure of a RETE-net must be modified to allow an expert system utilizing a RETE-net to respond to critical changes in a real-time environment. Furthermore, the number of tests performed in a RETE-net must be reduced to improve performance. In particular, the RETE-net must discriminate between noncritical and critical data changes and only respond to critical data changes.

SUMMARY OF THE INVENTION

Accordingly, the present invention modifies a RETE-net to provide mechanisms that enable the RETE-net to only respond to critical changes in data thereby preventing unnecessary propagation of data through the RETE-net and unnecessary firing of rules. These mechanisms efficiently minimize computation and interaction among data elements.

The present invention modifies a RETE-net and its associated mechanisms to effectively and efficiently represent @T and @F clauses that restrict the times that certain data is active. The @T and @F clauses specify when a condition "becomes true" or "becomes false", respectively. These clauses provide a necessary part of a production system language for specifying real-time computations by responding only to critical changes in data.

An example of a rule using the rule structures of OPS5 production-system language with the addition of the @T clause of the present invention is set forth below.

(P Emergency-Rule
   (Coolant-Data   TEMPERATURE $T)
   (Steam-Data     PRESSURE ($P > 60)
                   RATE-OF-FLOW ($R < 150)
                   TEMPERATURE @T (> $T + 50)
—>
(Write "Nuclear Plant Meltdown Imminent")

-continued

```
)
```

The left-hand side of the rule is represented by two data structures. The first data structure labeled "coolant-data" has an attribute "temperature" that is represented by a variable "ST". The second data structure "steam-data" has attributes for "pressure" and "rate-of-flow" that are represented by the variables "$P" and "$R" respectively The third attribute of the steam-data data structure is "temperature" that is represented by the condition "@T(>ST+50)" where "ST" represents the temperature of the coolant. Thus, when the steam pressure is greater than 60 and the steam rate-of-flow is less than 150 and the steam temperature "becomes greater than" the coolant temperature plus 50, the left-hand side of the rule is satisfied. It is determined that the steam temperature "becomes greater than" the coolant temperature plus 50 by applying two tests. The first test determines if the value for the steam temperature is greater than the coolant temperature plus 50. If the first test is satisfied, a second test determines if the last value for the steam temperature also satisfied the first test. If so, the right-hand side is not executed. If the last value for the steam temperature did not satisfy the first test, the right-hand side of the rule is executed. The execution of the right-hand side of the rule causes the message "Nuclear Plant Melt Down imminent" to be written to a printer or a video display terminal.

The @T and the @F clauses are represented by test nodes. Unlike traditional one input test nodes, the @T and @F nodes have an associated memory. The memory is divided into a new-value portion and an old-value portion. The new-value portion is where received tokens are stored. The old-value portion is where tokens stored in the new-value portion are moved when a delete token corresponding to the stored token is received. Further, the behavior of the @T and @F nodes is different than the behavior of traditional test nodes. When an add-token, i.e., a token that augments the token list in a node or nodes to which the token is applied, arrives at an @T or @F node, it is either the first such token for some dynamic data item or it is changing an existing data value stored in the old-value portion of memory. If it is the first time such token is received, it is considered an initialization event. The token is added to the new-value portion of memory but not propagated to successor nodes. The condition associated with the node is computed and stored in the new-value portion of memory along with the add-token.

If a delete-token, i.e., a token that subtracts a token from the memory of a node and successor nodes, arrives at an @T or @F node, it will always be for a token previously added. This delete must be part of a "modify" action indicating that an add-token will be following soon. The corresponding add-token stored in the new-value portion of memory is marked "deleted" and moved to the old-value portion of memory. No further propagation of the delete token takes place.

When the next add-token arrives at an @T or @F node, its associated condition is computed. The token along with its associated condition is then stored in the new-value portion of memory. If the condition of the received token satisfies the condition of the node, it is then compared with the condition of any corresponding tokens stored in the old-value portion of memory to determine if a change to a critical state has taken place. If such change has occurred, e.g., in an @T node, the condition of the token stored in the old-value portion was false and the condition of the received token has become true, the add-token is then propagated to successor nodes.

DETAILED DESCRIPTION

Figure 1:
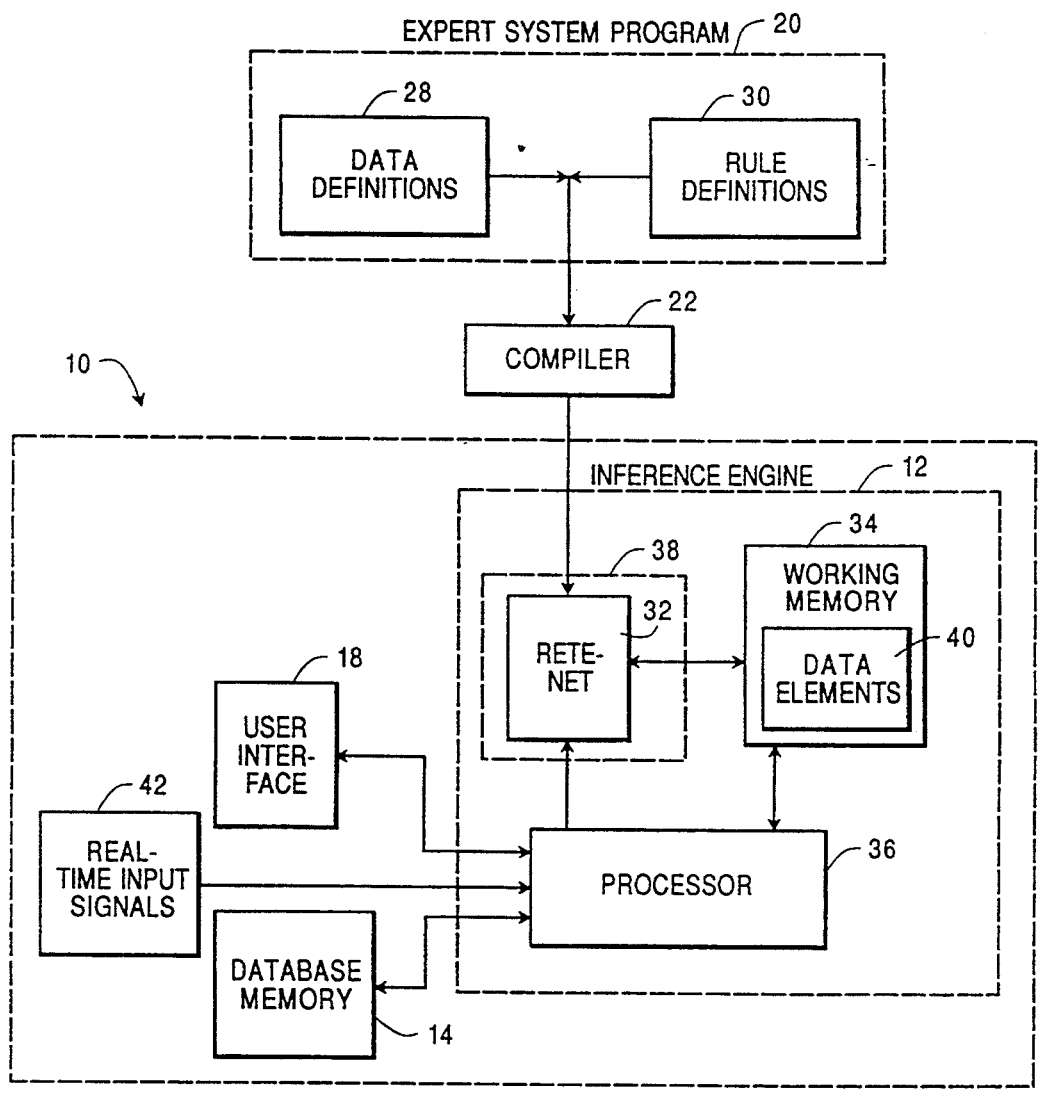
FIG. 1 is a block diagram of an expert system.

Referring now to the drawings, and initially to FIG. 1, there is illustrated, an expert system 10. Expert system 10 comprises an inference engine 12, database memory 14, real-time input signals 42 and a user interface 18. Inference engine 12 is coupled to database memory 14, real-time input signals 42 and user interface 18.

An expert system program 20 and an expert system compiler 22 are also coupled to expert system 10. Expert system program 20 comprises a set of data definitions 28 and a set of rule definitions 30. Data definitions 28 identify categories of data which program 20 will use during its operation. A set of rules, described by rule definitions 30, is coupled to the set of data definitions 28 to enable the rules to manipulate the data. Data definitions 28 and rule definitions 30 are compiled by compiler 22 and stored in inference engine 12 as a discrimination net data structure known as a reticular net, i.e., RETE-net 32.

Expert system program 20 may also includes links to other programs for performing tasks such as accessing remote databases when called upon during the execution of expert system program 20.

Inference engine 12 comprises a memory 38, working memory 34 and a processor 36. Memory 38 and working memory 34 are coupled to each other and to processor 36. RETE-net 32 created by compiler 22 is stored in memory 38. Working memory 34 comprises a plurality of data elements 40 that are input to and output from RETE-net 32 by processor 36. Processor 36 is coupled to user interface 18, real-time input signal 42 and database memory 14.

Processor 36 obtains data from database memory 14, user interface 18 or real-time input signals 42 by performing initial computations specified by data definitions 28 or by executing right-hand sides of rules. This data is stored in working memory 34 by processor 36 as a set of data elements 40. A data element 40 identifies one or more data definitions and a value for each definition.

Inference engine 12 as described in this embodiment, utilizes processor 36 as a "generic" processor adapted to accommodate multiple applications. Inference engine 12 could be configured to have memory 38 incorporated into processor 36 thereby converting processor 36 from a generic processor to a processor adapted to perform the specific function of expert system 10. Furthermore, expert system 10 could be arranged in a multiprocessor configuration utilizing a plurality of processors for processing the rules organized as RETE-net 32 as described in U.S. patent application Ser. No. 103,364, filed Sep. 30, 1987, in the names of William Barabesh and William S. Yerazunis, entitled "Method for Operating a Parallel Processing System and Related Apparatus", which is hereby expressly incorporated herein by reference.

RETE-net 32 resident in memory 38 comprises test nodes, including the test nodes of the present invention, to provide a response only to critical changes in data, and join nodes utilized in traditional RETE-net implementations such as AND, NOT and EQUAL. RETE-net 32 can be viewed as a data structure that has nodes which are either pointers to test functions or actual sections of a computer program. If RETE-net 32 is viewed as a data structure, a test node has a pointer to a test and a pointer to the list of nodes that a token, which represents individual data elements 40, resulting from the test are to be sent. The tests can differ from case to case.

In operation, whenever new data elements 40 are stored in working memory 34, processor 36 creates add-tokens for them and applies the tokens one at a time to RETE-net 32. These tokens are processed by a process known as "matching" through RETE-net 32 to determine if one or more rules are applicable to the data stored in working memory 34.

When a token enters a test node, a test is performed on the token. If the test is successful, the token is passed to successor nodes of the test node in RETE-net 32. If the test is unsuccessful, the match fails and no further processing of this token occurs.

When a token reaches a traditional join node such as one embodying AND, NOT or EQUAL logical connectors, the token is stored in the memory associated with the input coupled to a test node representative of a test condition in a rule to the left or right side of the logical connector represented by the join node, i.e., beta memory or alpha memory, respectively, on which it is received. The token is stored for the purpose of matching the token with another token that is currently stored in the memory of the other side of the join node, or that will reach the other side of memory in the future. If the token enters the join node on the beta side, it is compared with tokens in or entering the alpha side of the join node. If the token enters the join node on the alpha side, it is compared with tokens in or entering the beta side of the join node. If a match is found, a new token, i.e., a complex token, is created to represent the previous tokens of the matching pair which satisfied the test of the join node. This complex token is then passed on to successor nodes in RETE-net 32.

After all matching is completed, one or more final tokens are passed to terminal nodes. Each token in the terminal nodes represents an instantiation of the rule represented by the terminal node. The tokens represent a combination of working memory elements 40 that satisfies the rule. Inference engine 12, pursuant to a conflict resolution scheme, will fire, i.e., execute, successful rules. If multiple rules are applicable or if a single rule is applicable to more than one combination of data elements, processor 36 performs conflict resolution to select one or more of such rule "instances" and fires those rule instances The entire process from matching, conflict resolution, to the firing of rules is referred to as a "recognize-act cycle". The recognize-act cycle is to expert systems as an instruction fetch and execute cycle is to traditional computers. In the recognition portion of a cycle, the system performs a matching process to recognize which rules are true. This step is analogous to an instruction fetch where the computer fetches the next instruction to be executed. The act process is where the system determines which of the true rules to fire and then fires them. Analogously, after an instruction is fetched, the traditional computer executes the instruction fetched. The recognize-act process is continuously repeated just as the instruction fetch and execute process is continuously repeated. For further details on the recognize-act cycle, reference should be made to U.S. patent application Ser. No. 364,021, filed Jun. 8, 1989, in the name of William Barbesh and William S. Yerazunis, entitled "Expert System for Performing Beta-Token Partitioning in a RETE NETWORK" which is hereby expressly incorporated herein by reference.

The firing of a rule instance may cause several results. For example, it may create new data or cause processor 36 to calculate a new value for existing data or to obtain more data either from database memory 14 or from user interface 18. Irrespective of how data is acquired, i.e., whether Created through a rule firing, collected in response to a rule firing or collected independently of the operation of RETE-net 32 through, e.g., real time input signals 42 or user interface 18, processor 36 stores any newly acquired data as data elements 40 in working memory 34, creates add-tokens for these new data elements, and applies the new add-tokens to RETE-net 32 in another inference cycle to find a rule instance for firing. If the newly acquired data represents a change of a data value for which an add-token had already been created during operation of expert system 10, processor 36 applies a delete-token representing the old data value to RETE-net 32, and then applies an add-token for the new data value. This process continues until no applicable rules are identified or until no new data elements 40 are generated or obtained independently or as the result of firing the rules.

The efficiency of the RETE-net utilization is that nodes can be shared among terminal nodes whose rule requires the test to be performed by that node. By sharing the results of tests, the repetition of the tests is minimized.

The present invention provides @T and @F test nodes which respond only to critical changes in data. When a token is received by an @T or @F test node, it is first determined if the token represents a critical data value by computing the condition of the token. If the token represents a critical state, it is then determined if a prior deleted version of the token, if any, is stored in an old-value portion of memory of @T or @F test node. If there is no prior version of the token stored in the old-value portion of memory, the token is stored in a new-value portion of memory along with its associated condition. No further propagation occurs because the token does not represent a change to a critical state. If it is determined that a previous value of the token is stored in the old-value portion of memory, the condition of the old-value is compared to the condition of the new token to determine if the new token represents a change to a critical state. The new token is stored in the new-value portion of memory. If the token represents change to a critical state, the token is then propagated to successor nodes. This process of selective comparison decreases the number of comparisons performed each time a new token is received by an @T or @F node, thereby improving the overall performance of the system. Thus, an @T or @F node responds only to changes in data that represent a change to a critical state.

An example of a problem in which an expert system may be used is now presented to further illustrate the @T and @F clauses of the present invention in a RETE-net. Suppose that expert system 10 of FIG. 1 were to be used to monitor the pulse rate of patients and to take certain actions pursuant to different pulse rates and other physical characteristics of such patients. In particular, if a patient's pulse rate is less than 50 beats/minute, the patient is more than 55 years old and the patient's height is greater than the patient's weight divided by three, then expert system 10 must take action. The action system 10 takes is to start intravenous saline, stop a dialysis machine and notify an emergency nurse through user interface 18. Another condition that expert system 10 would take action on is if the patient's pulse rate is greater than the patient's age plus 25, the patient is over 65 years of age and the patient's height is greater than the patient's weight divided by two. If these conditions occur, expert system 10 would start an oxygen tank and notify an emergency nurse.

The two conditions set forth above can be written as a set of rules which can be stored in rule definitions 30 and compiled by compiler 22 into a RETE-net. Using the traditional RETE-net rule structures of the OPS5 production-system language, the above conditions are set forth below:

```
(P Rule-A    (Patient-data NAME $name    AGE (> 55)
                 WEIGHT $wt    HEIGHT (> $wt/3))
             (Monitor-data   NAME $name   PULSE (< 50))
             --->
             (Start Intraveneous Saline)
             (Stop Dialysis)
             (Notify Emergency Nurse)
             )
(P Rule-B    (Patient-data,   NAME $name   AGE $age (> 65)
                 WEIGHT $wt    HEIGHT (> $wt/2))
             (Monitor-data   NAME $name    PULSE (> $age + 25))
             --->
             (Start Oxygen)
             (Notify Emergency Nurse)
             )
```

A conventional RETE-net generated by compiler 22 pursuant to Rules A and B is stored in memory 38. The configuration of the RETE-net is set forth in FIG. 2. The RETE-net implementing Rules A and B comprises a start node 80, seven test nodes 81–87, two AND join nodes 88–89 and two terminal nodes 91 and 92. Outputs of start node 80 are coupled to inputs of test nodes 81–82. An output of test node 81 is coupled to an input of test node 83. An output of test node 83 is coupled to an input of test node 85. An output of test node 85 is coupled to a left side input of AND join node 88. An output of test node 86 is coupled to a right side input of AND join node 88. An output of the AND join node 88 is coupled to terminal node 91.

An output of test node 81 is coupled to an input of test node 84. An output of test node 84 is coupled to an input of test node 87. An output of test node 87 is coupled to a left side input of AND join node 89. An output of test node 82 is coupled to a right side input of AND join node 89 and an input of test node 86. An output of AND join node 89 is coupled to terminal node 92.

Each one of test nodes 81–87 represent one of the conditions set forth in the Rules A and B. For example, node 86 is the test node where data representative of a patient's pulse rate is tested. If it is determined that the pulse rate of a patient, for example, patient A, is less than 50, node 86 passes a token to the right side of join node 88. If patient A is over 55 years old, node 83 passes a token to test node 85. If the patient A's height is greater than patient A's weight divided by three, node 85 passes a token to the left side of join node 88. Join node 88 will generate and pass a complex token as a result of the logical ANDing of the tokens passed from nodes 85 and 86 to terminal node 91 since both tokens are representative of patient A. This complex token indicates that Rule A has been satisfied and is ready to be fired by inference engine 12.

Figure 2:
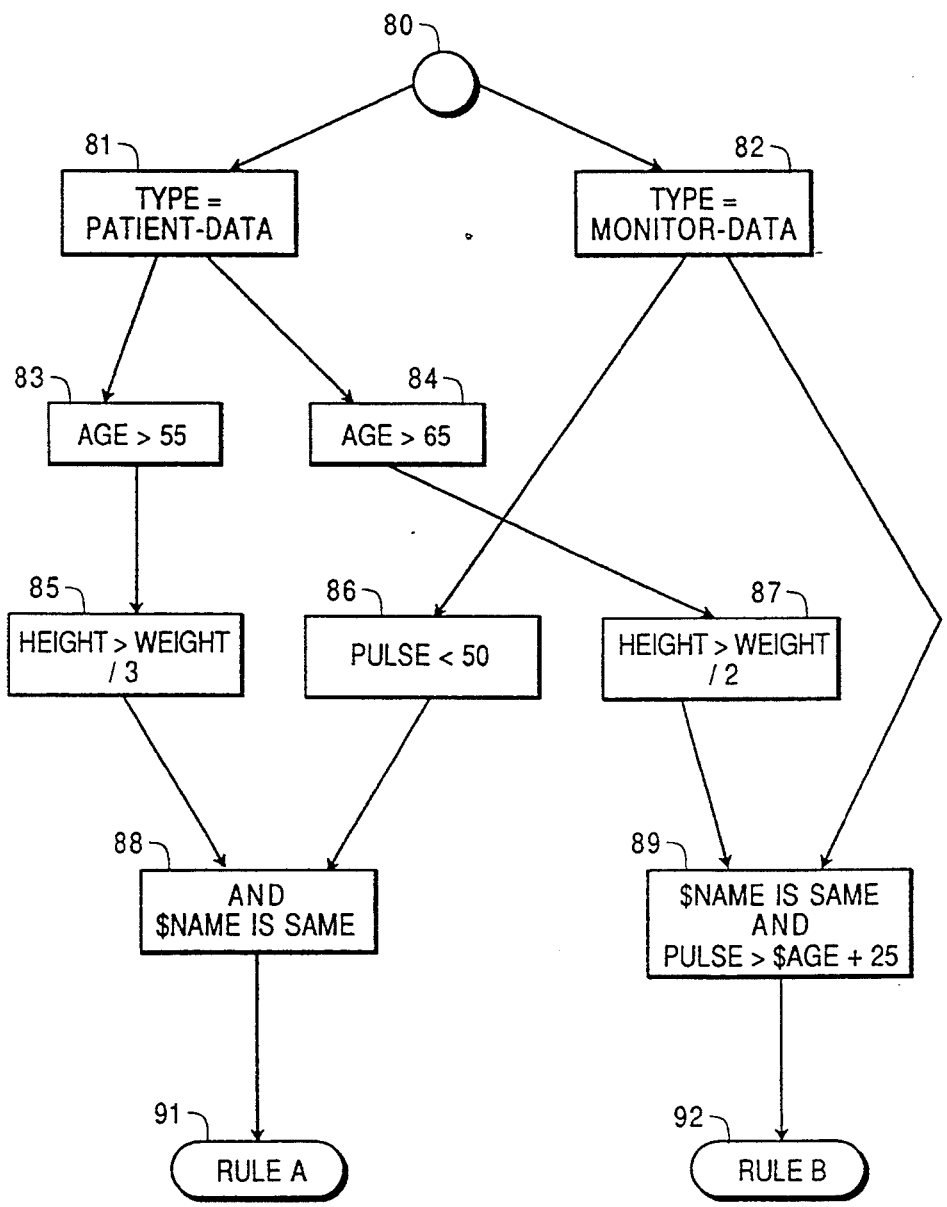
FIG. 2 is an illustration of an embodiment of a traditional RETE-net.

Each time a token indicative of a pulse rate less than 50 beats/minutes or greater than a patient's age plus 25 is received by RETE-net of FIG. 2, a rule is ready to be fired by inference engine 12 provided the other more static conditions, i.e., age and height to weight ratio, are satisfied. Thus, a rule will be satisfied if a patient's pulse rate changes from either a critical state, one requiring action, to a critical state, e.g., 42 beats per minute to 45 beats per minute, or a noncritical state, one requiring no action, to a critical state, e.g., 52 beats per minute to 48 beats per minute.

Start node 80, test nodes 81–87, AND join nodes 88–89 and terminal nodes 91 and 92 illustrated in the RETE-net of FIG. 2 can be represented by data structures. For example, a data structure for start node 80 would include a pointer to a list of addresses for successor nodes in RETE-net 32, that is, the addresses of test nodes 81–82. A data structure for test nodes 81–87 would include a pointer to the memory address of the test assigned to the test node and pointers to the addresses of the beta memories and alpha memories of the successor node or nodes to which tokens are to be sent. A data structure for AND join nodes 88–89 would include pointers to the addresses of the beta memory and alpha memory of the join node and a pointer to the location in working memory 34 of the test identified by the node to match beta memory and alpha memory tokens. A data structure for terminal nodes 91 and 92 would include a pointer to the addresses in working memory 34 where one or more complex tokens received from the join nodes are stored. The data structure would also include a pointer to the location in memory 38 where the action list, i.e., a program executable to perform the right hand side of a rule, of rules A and B identified by the terminal node 91 and 92 are stored.

The tokens representative of changing data values are also represented by data structures. A data structure for a primitive token would include at least a pointer to the location in working memory 34 where the data element 40 associated with that primitive token is stored, and a field that indicates whether the token is an add-token or a delete-token.

A data structure for a complex token would include a pointer to the addresses of the tokens from which the complex token is formed, an add/delete field and other fields for pointers to conflict resolution sequences and other functions associated with the token.

The conditions set forth in Rules A and B described above can also be written as a set of rules utilizing traditional RETE-net mechanisms and the @T mechanism of the present invention. These rules would also be stored in rule definitions 30 and compiled by compiler 22 into a RETE-net. The rules utilizing the @T mechanism are set forth below using the rule structures of the OPS5 production-system language.

```
(P Rule 1  (Patient-data  NAME $name  AGE (> 55)
              WEIGHT $wt  HEIGHT (> $wt/3))
           (Monitor-data  NAME $name  PULSE @T(< 50))
           —>
           (Start Intravenous Saline)
           (Stop Dialysis)
           (Notify Emergency Nurse)
           )
(P Rule 2  (Patient-data  NAME $name  AGE $age (> 65)
              WEIGHT $wt  HEIGHT (> $wt/2))
           (Monitor-data  NAME $name  PULSE
              @T(> $age + 25))
           —>
           (Start Oxygen)
           (Notify Emergency Nurse)
           )
```

By writing the Rules 1 and 2 using the @T clause, the conditions are separated into a dynamic condition, the pulse rate, and relatively static conditions, i.e., the patient's age and height to weight relationship. The variable "$name" links the pattern describing the data structure for patient-data to the pattern describing the data structure for monitor-data in the rules.

The RETE-net generated by the compiler 22 pursuant to Rules 1 and 2 is stored in working memory 38. The configuration of the RETE-net according to the present invention is set forth in FIG. 3. The RETE-net implementing Rules 1 and 2 comprises a start node 100, six test nodes 101–106, two AND join nodes 107 and 108, two @T test nodes 109 and 110 and two terminal nodes 111 and 112. Outputs of start node 100 are coupled to inputs of test nodes 101–102. An output of test node 101 is coupled to an input of test node 103. An output of test node 103 is coupled to an input of test node 105. An output of test node 105 is coupled to a left side input of AND join node 107. An output of test node 102 is coupled to an input of @T test node 109. An output of @T test node 109 is coupled to a right side input of AND join node 107. An output of join node 107 is coupled to terminal node 111. An output of test node 101 is coupled to an input of test node 104. An output of test node 104 is coupled to an input of test node 106. An output of test node 106 is coupled to a left side input of AND join node 108. An output of test node 102 is coupled to a right side input of AND join node 108. An output of join node 108 is coupled to an input of @T test node 110. An output of @T test node 110 is coupled to terminal node 112.

Figure 3:
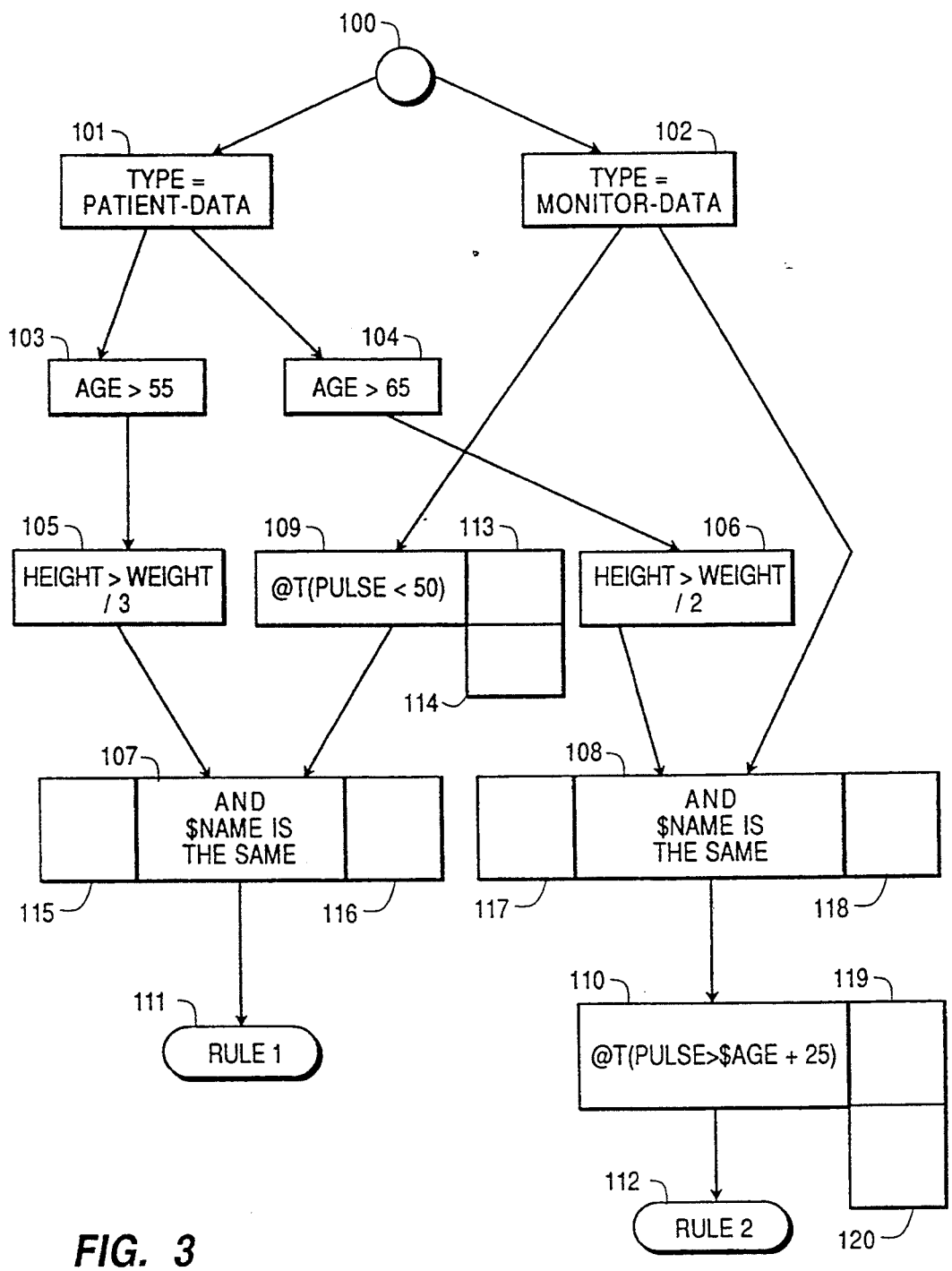
FIG. 3 is a diagram of a RETE-net for specifying real-time conditions according to the present invention.

The RETE-net illustrated in FIG. 3 is stored as RETE-net 32 in memory 38 in inference engine 12. Inputs to RETE-net 32 come from processor 36 and working memory 34. As described above, a plurality of data elements 40 are stored in working memory 34. These data elements represent a record to be processed by RETE-net 32. In this example, data elements 40 represent patient and other records. Each one of the plurality of data elements 40 is carried through RETE-net 32 in a token.

Comparing FIGS. 2 and 3, similar tests are performed in each of test nodes 81–85 and 87 of FIG. 2 as are performed in each of test nodes 101–106 in FIG. 3. Two AND join nodes 88 and 89 of FIG. 2 perform a similar function as two AND join nodes 107 and 108 of FIG. 3. The major difference in the RETE-nets lies in that test node 86 and part of the test of AND join node 89 in FIG. 2 are replaced by, respectively, @T test nodes 109 and 110 in FIG. 3. By replacing these functions with @T test nodes 109 and 110, the RETE-net will only respond to critical changes in data instead of all data changes as will be explained in more detail below.

Figure 4:
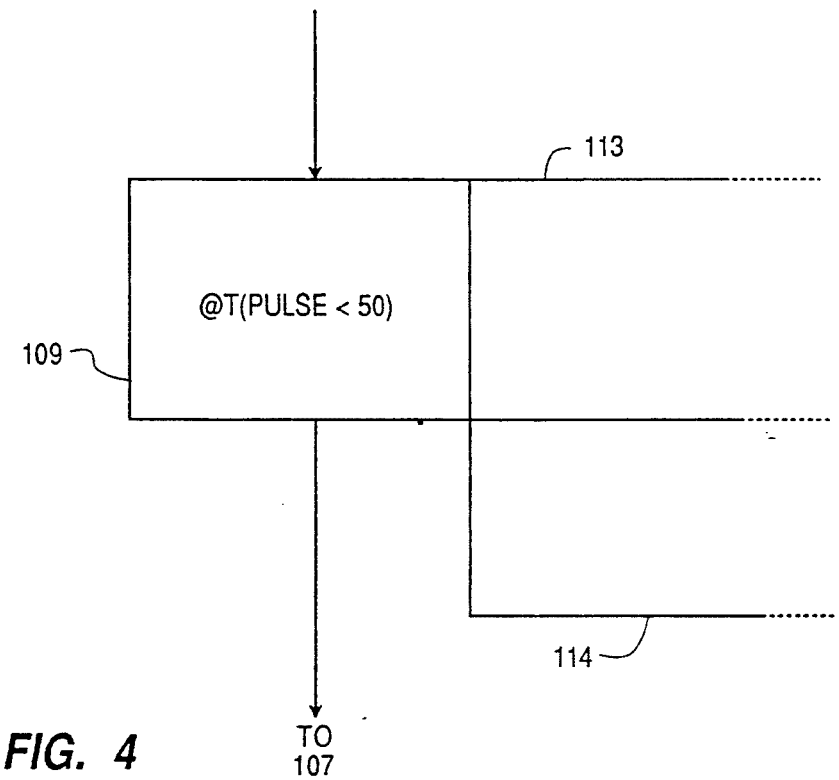
FIG. 4 is an illustration of an @T node in FIG. 3.

Referring now to FIG. 4, there is illustrated the structure of @T test nodes 109–110 of the present invention. Using node 109 as an example, node 109 comprises a memory having a new-value portion 113 and an old-value portion 114. The test of the node computes the condition for each add-token received by node 109. The condition determines if the token is representative of a pulse rate that has become true, i.e., is less than 50 beats/minute.

Figure 4A:
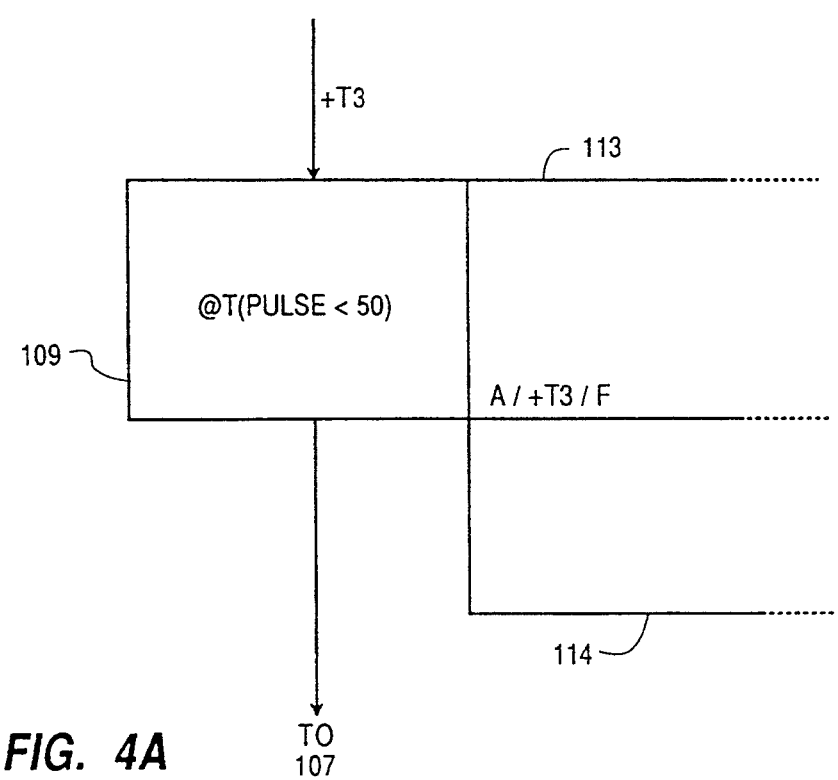
FIGS. 4A–4C are illustrations of the @T node 109 illustrated in FIG. 3 in different processing states.

Referring to FIG. 4A, there is illustrated the state of node 109 when a token +T3 representative of a data element comprising data related to patient A's pulse rate which is 55, is received by node 109. The first step performed is the calculation of the condition for +T3. Since A's pulse rate is not less than 50, the condition of the token is false. The token +T3 is stored in new-value portion 113 of memory along with its associated condition as +T3/F. These entries are indexed in node 109 memory by the common variable in the rule patterns for patient data and monitor data, i.e., "$name" which is representative of the patient's name Thus, the patient name is the index that points to +T3. No token is propagated out of node 109 because +T3/F does not represent a change to a critical state.

As discussed above, test node 102 coupled to node 109 passes a token if a pulse rate for a patient is present in the token. The @T node determines if the change is critical, i.e., the data meets some parameter of the @T clause. This critical change is determined by utilizing either the @T or the @F operator specified in the @T or @F clause. Expert system 10 is monitoring a patient's pulse rate. The critical state occurs when the pulse rate of a patient becomes less than 50 beats/minute. A token containing pulse rate data would be passed to the @T node. The condition of the token is then calculated in the @T node. If the pulse rate has changed from a noncritical (above 50) to a critical Value (below 50), then the token is propagated to successor nodes. This example demonstrates a test node implementing the @T construct. The change in a patient's pulse rate could just as easily result in a token being propagated if the pulse rate is not less than 50 beats/minute thereby implementing an @F construct.

When the token +T3 was received by node 109, @T node 109 did nothing other than store the token in the new-value portion 113 of memory along with its associated condition. Even if a token representative of a critical value was passed to the node 109, no further tests would be performed because there are no old values stored in the old-value portion 114 of memory that could be used for comparison. This additional check is provided in node 109 to prevent the propagation of tokens out of node 109 which may result in a rule being fired when the token passed by the test node is indeed a critical value, but not a change from a noncritical to a critical state. Thus, @T node 109 responds only to critical changes in data. Of course, expert system 10 could initialize the new-value portions of all @T or @F nodes to contain noncritical values, thus enabling response to the first token received.

Once a token is stored in the new-value portion 113 of memory, any token representative of the same condition as the token previously stored in memory goes through a series of tests. Upon receiving a new value for the token, its condition is computed and then compared to the condition of the old-value of the token stored in the old-value portion 114 of memory as described below. If the condition for the new token is the same, the new token is stored and the processing of this token stops. If, however, the conditions are different, i.e., the old-value was false and the new value is true, the received token is propagated to successor nodes to determine if any matches are found with entries stored in successor nodes. If a match is found, a complex token representative of the matching pair of tokens is propagated out of the successor nodes in RETE-net 32.

In order for an @T node 109 to function properly in a RETE-net 32, it should have the token manipulation feature of other nodes in a traditional RETE-net. That is, node 109 should be able to accept add and delete tokens. Thus, the present invention implements @T and @F nodes to accomplish data changes by processing a delete-token and then an add-token. The use of the delete-token avoids the complication of having nodes coupled to node 109 be aware of the type of nodes that would utilize passed tokens. The @T and @F nodes appear as traditional nodes to nodes above and below them in RETE-net 32.

Figure 4B:
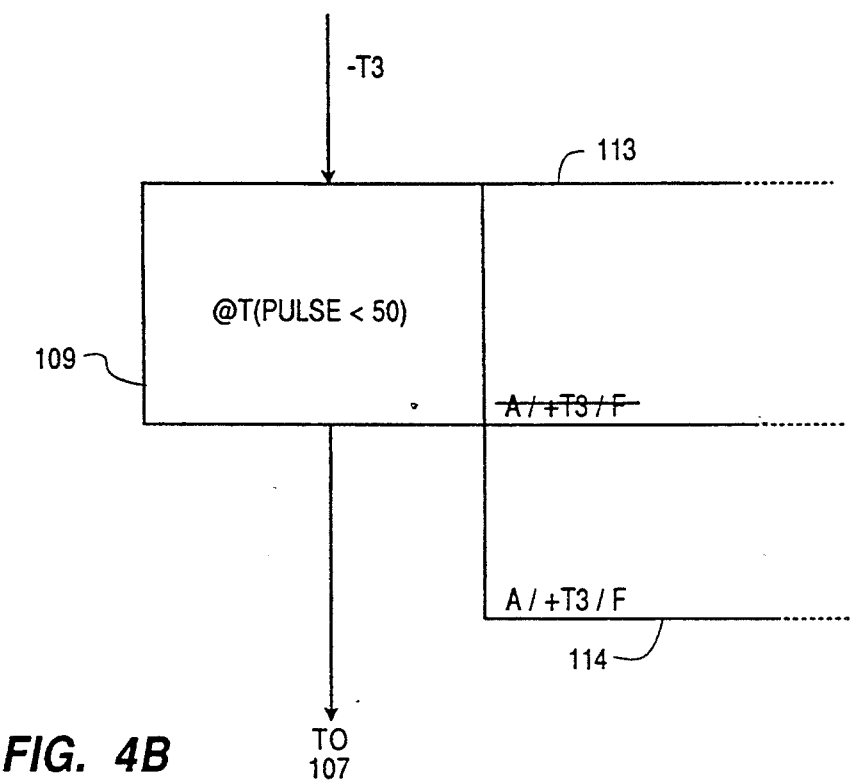

Referring now to FIG. 4B, there is illustrated, the use of the delete-token to respond to changing data. Using the example of monitoring a patient's pulse rate set forth above, a token −T3 is passed to node 109 when patient A's pulse rate changes. Node 109 then identifies the previously received add-token for patient A stored as +T3/F, which indicates the condition of the previously received token, marks it as deleted and stores it in the old-value portion 114 of the memory.

Figure 4C:
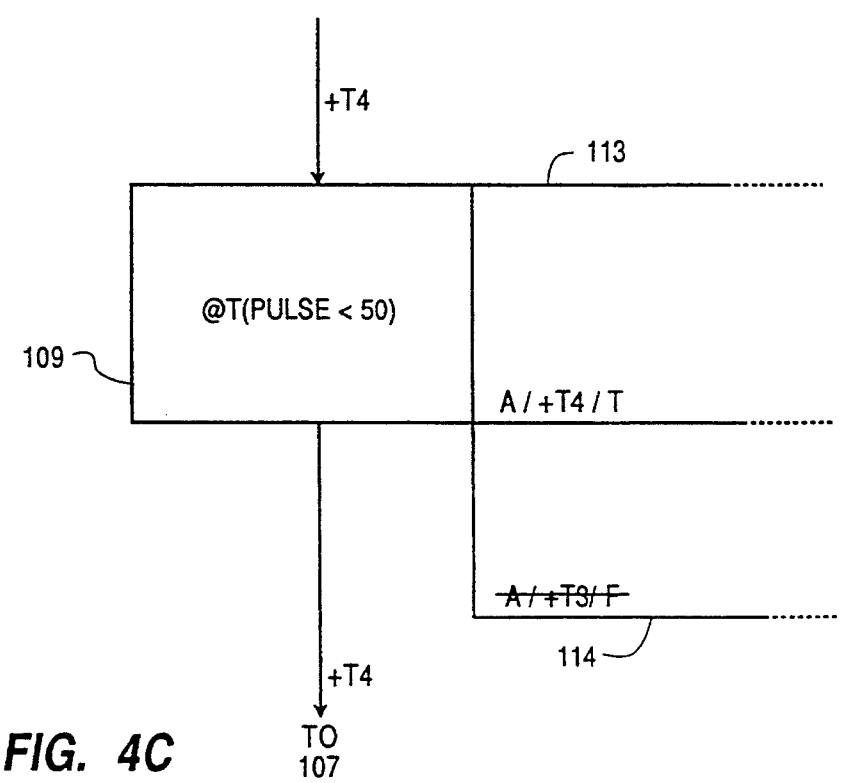

Referring now to FIG. 4C, there is illustrated the state of node 109 when an add-token for a patient A is received after a delete-token. When a new token +T4, representative of a data element comprising data related to patient A's pulse rate which is now 45, is received by node 109, the condition for +T4 is computed. A check is made to determine if a prior deleted token is present in the old-value portion 114 of memory since the condition is true. Since there is a prior deleted token for patient A, the condition of the old value of the token is compared to the condition of the received token to determine if there has been a change in condition. The prior deleted token is discarded. It is determined that +T4 represents a change to a critical state because its condition is true and the condition of the stored token is false, i.e., +T4 represents a pulse rate that has "become true". Thus, the received token is propagated out to successor nodes to be compared with the tokens stored in successor nodes.

Referring now to FIGS. 5A–5G there is illustrated, the structure of RETE-net 32 stored in memory 38. In the following example, a token representative of a data element one is T1, a token for a data element two is T2, and so on. The data elements comprise information such as a patient's name, age, weight, height and pulse rate. The structure of RETE-net 32 illustrated in FIGS. 5A–5G is identical to RETE-net 32 depicted in FIG. 3.

Figure 5A:
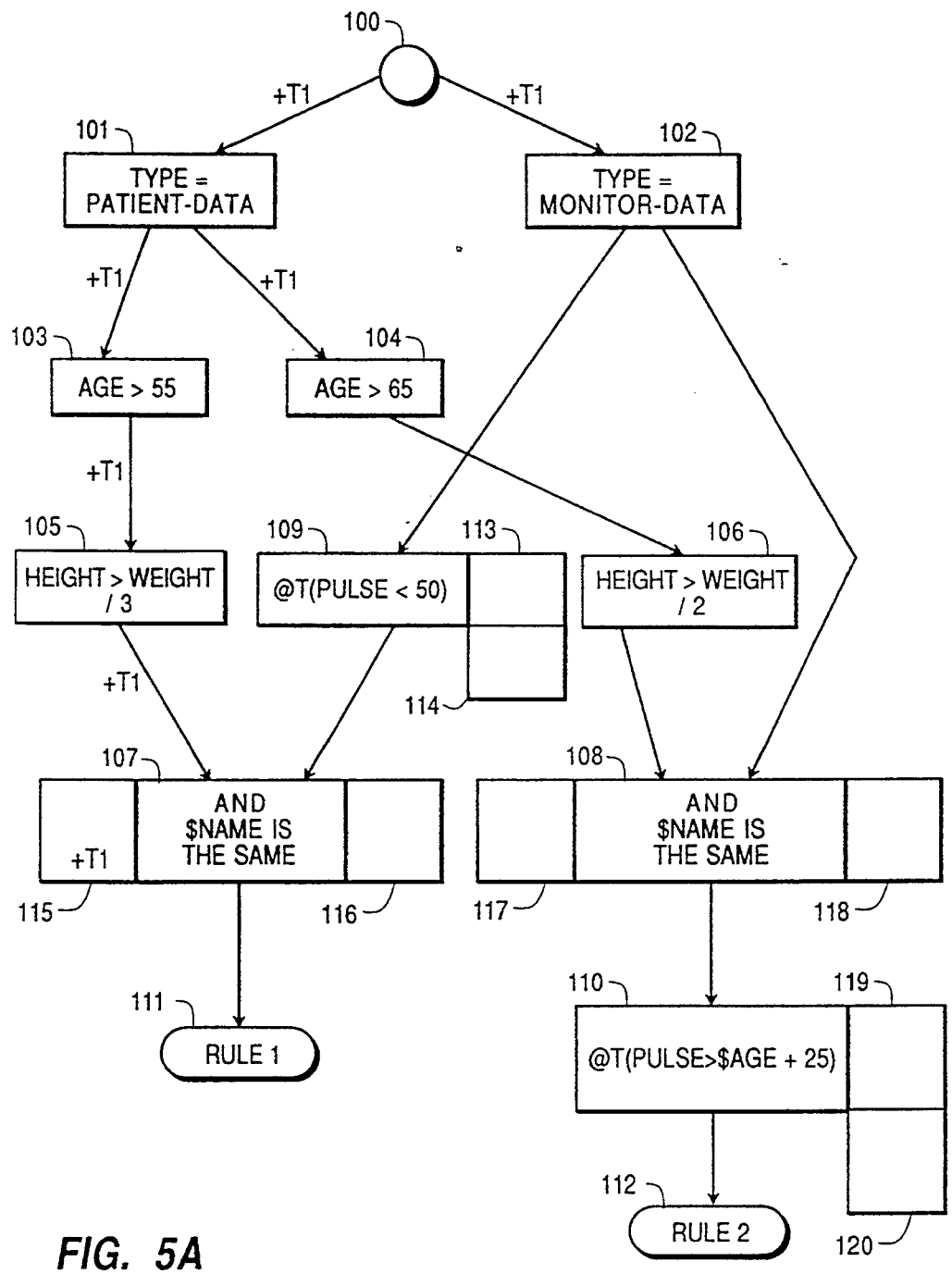
FIGS. 5A–5G are illustrations of the RETE-net illustrated in FIG. 3 in different processing states.

FIG. 5A depicts the state of RETE-net 32 after a data element one is processed through net 32. Data element one, +T1, is a patient record for a patient named John, and is represented as follows:

+T1: (patient-data   Name John   Age 59   Weight 140
Height 70 . . . {other attributes})

Processor 36 manages the passing of tokens from node to node. As set forth above, each node is a data structure that has a number of pointers. Processor 36 initially passes a pointer to token +T1 to start node 100 of RETE-net 32. Processor 36 will then pass the pointer to −T1 in test nodes 101–102. The passing of a pointer to −T1 can be accomplished in a number of ways such as sequentially, in parallel, or recursively. The mechanism by which +T1 is passed on from node to node does not restrict the behavior or functioning of RETE-net 32.

Processor 36 may implement the passing of pointers to tokens through RETE-net 32 through a known technique referred to as "depth first traversal of a directed acyclic graph". RETE-net 32 is a directed acyclic graph because each branch coupling one node to another carries tokens that flow down in one direction through the net. Depth first traversal means that processor 36 selects an initial path for processing a token, e.g., +T1, through RETE-net 32, e.g., from start node 100 to test node 101 to join node 107, etc., until the test performed at one of the nodes being traversed is not satisfied. When +T1 "fails" a node test, processor 36 retraces its path of execution to start node 100 and continues traversing the nodes by starting down the next branch. Processor 36 does not traverse the complete RETE-net 32 because not every node, i.e., those nodes below a node where the current token +T1 failed the node's test, is visited.

The token +T1 passes the test at node 101 since the token is representative of patient data. The token is then passed to node 103 where it passes the test since John is over 55 years old. The token is passed to node 105 where it is tested to determine if John's height is greater than his weight divided by three. Since this is true, the token is then passed to the left input of join node 107 where it is stored in beta memory 115 and compared to tokens stored in alpha memory 116. Since AND join node 107 performs a simple logical AND test, i.e., looking for the presence of two tokens for the same patient, and there are no tokens in alpha memory 116, +T1 fails the test of node 107. The token is then passed from node 101 to node 104 where it fails the test since the patient is not over 65 years old. It will also fail the test at test node 102 since this test is irrelevant to +T1 since +T1 represents a patient record whereas node 102 responds to monitor data.

Figure 5B:
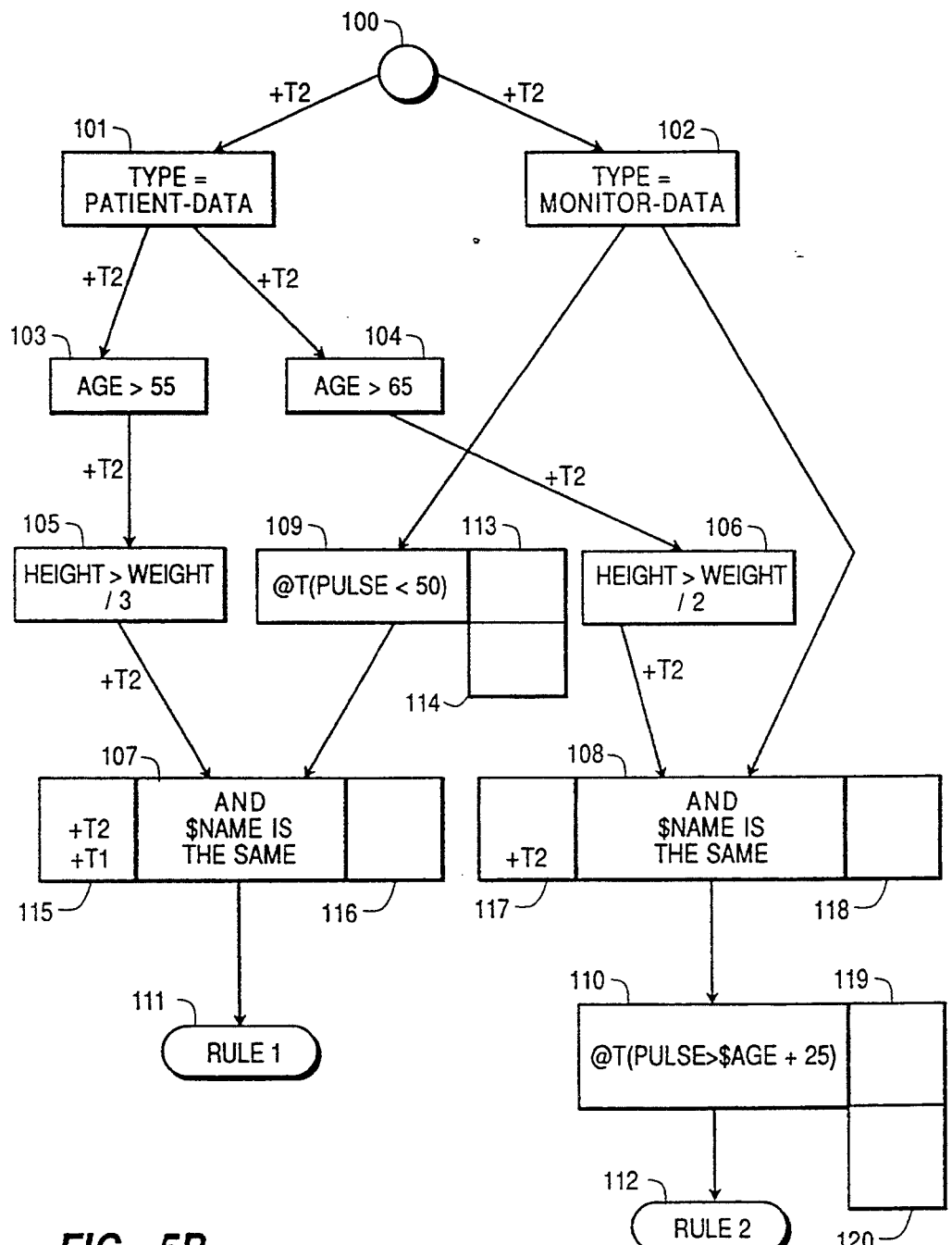

FIG. 5B illustrates the state of the RETE-net 32 after a data element two, +T2, is processed through the RETE-net 32. Data element two is a patient record for a patient named Jill and is represented as follows:

+T2: (patient-data   Name Jill   Age 66   Weight 120
Height 66 . . . {other attributes})

The processing of the add-token +T2 representative of the data element two is very similar to the processing of the add-token +T1 except that a different set of tests are satisfied. For example, +T2 passes the tests at test nodes 101, 103, 104, 105 and 106 and fails the test at test node 102. In a similar fashion, +T2 is stored in beta memory 117 of AND join node 108 and in beta memory 115 of AND join node 107. Since there are no tokens stored in alpha memory 118 or 116, the AND tests are not satisfied, thus the processing of the token stops here.

Figure 5C:
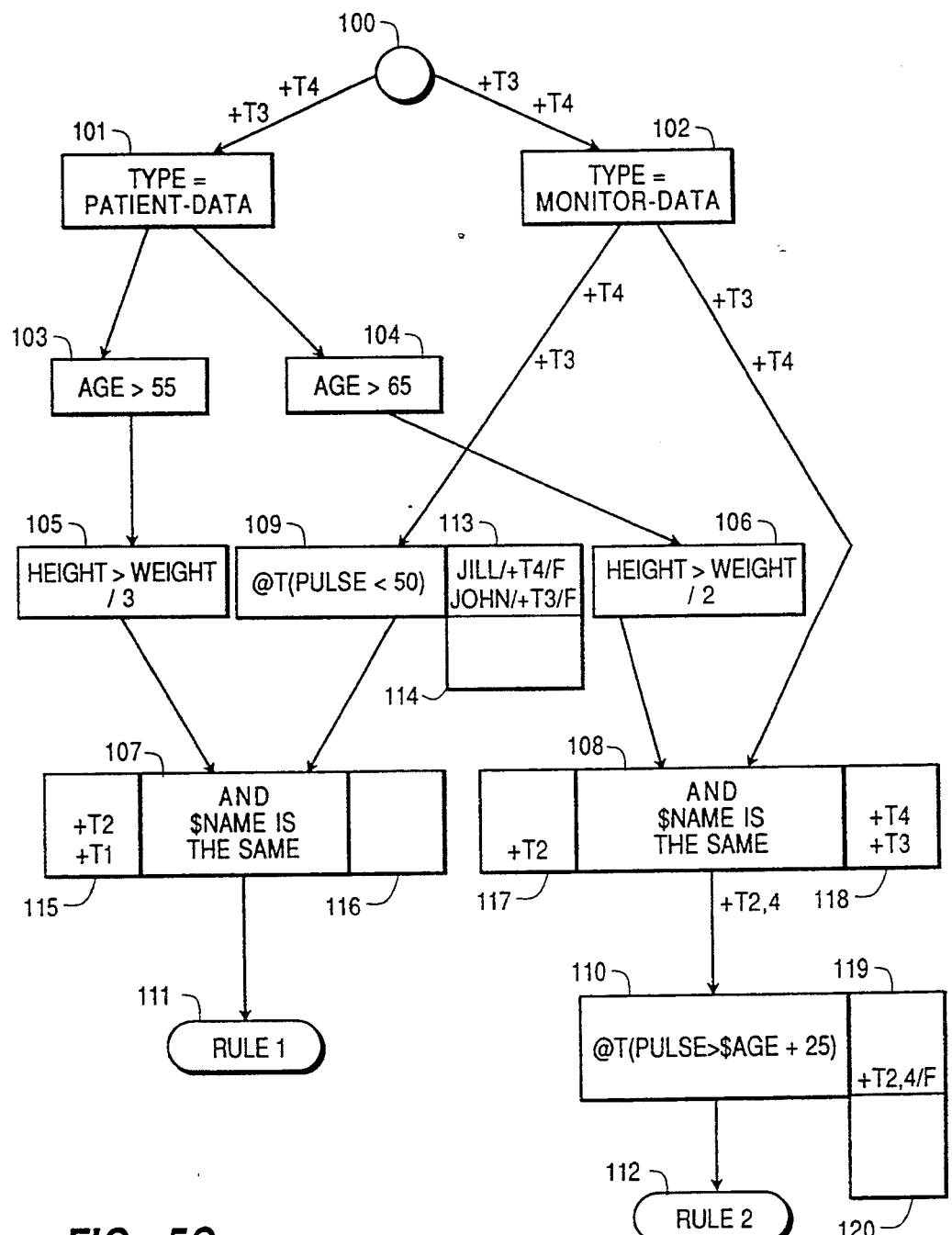

FIG. 5C illustrates the state of RETE-net 32 after data elements three, +T3, and four, +T4, are passed through the net 32. The data element three is data from a pulse meter attached to the patient John, and is represented as follows:

+T3: (monitor-data  Name John  Pulse 70  Number 46  Date 10/10/89 . . . )

The data element four represents data from a pulse meter attached to the patient Jill, and is represented as follows:

+T4: (monitor-data  Name Jill  Pulse 80  Number 47  Date 10/10/89 . . . )

Both the add-tokens +T3 and +T4 representative of the data elements three and four, respectively, are passed to start node 100 and passed to test nodes 101-102. Both tokens will fail the test of test node 101 and pass the test of test node 102. These tokens are propagated to the inputs of @T node 109 and the right input of AND join node 108. The condition of these tokens are calculated in node 109 to be false since the pulse rates are not less than 50 beats/minute. Therefore, +T3 and T4 are stored in the new-value portion 113 of node 109 memory along with their associated condition as John/+T3/F and Jill/+T4/F, respectively. These entries are indexed in node 109 memory by the common variable in the rule patterns for patient data and monitor data, i.e., "$name" which is representative of the patient's name. Thus, the patient name is the index that points to +T3 and +T4. No further propagation from node 109 occurs since the conditions are false.

Upon receiving +T3 and +T4, node 108 first stores the tokens in its alpha memory 118. Node 108 then performs its test of logically ANDing the tokens received with any token stored in the opposite side memory, i.e., beta memory 117 to match tokens representative of the same patient. The only token stored in beta memory 117 is +T2 which is representative of patient Jill. Thus, no match occurs with +T3 but a match does occur with +T4 since +T4 contains pulse rate data for Jill. Node 108 generates a complex token representative of the matching pair of tokens, +T2,4, and then passes it to @T test node 110.

Upon receiving the complex token, node 110 computes the token's condition to ascertain if the patient Jill's pulse rate is greater than 91, which is her age, 66, plus 25. The condition of this token is false since the pulse rate is 80. Therefore, node 110 stores the complex token in its new-value portion 119 of memory with its associated condition as +T2,4/F. Entries in new-value portion 119 of node 110 memory are indexed by the $name, $weight and $age variables in the rule patterns for patient and monitor data. No further propagation or processing of this token is performed.

Figure 5D:
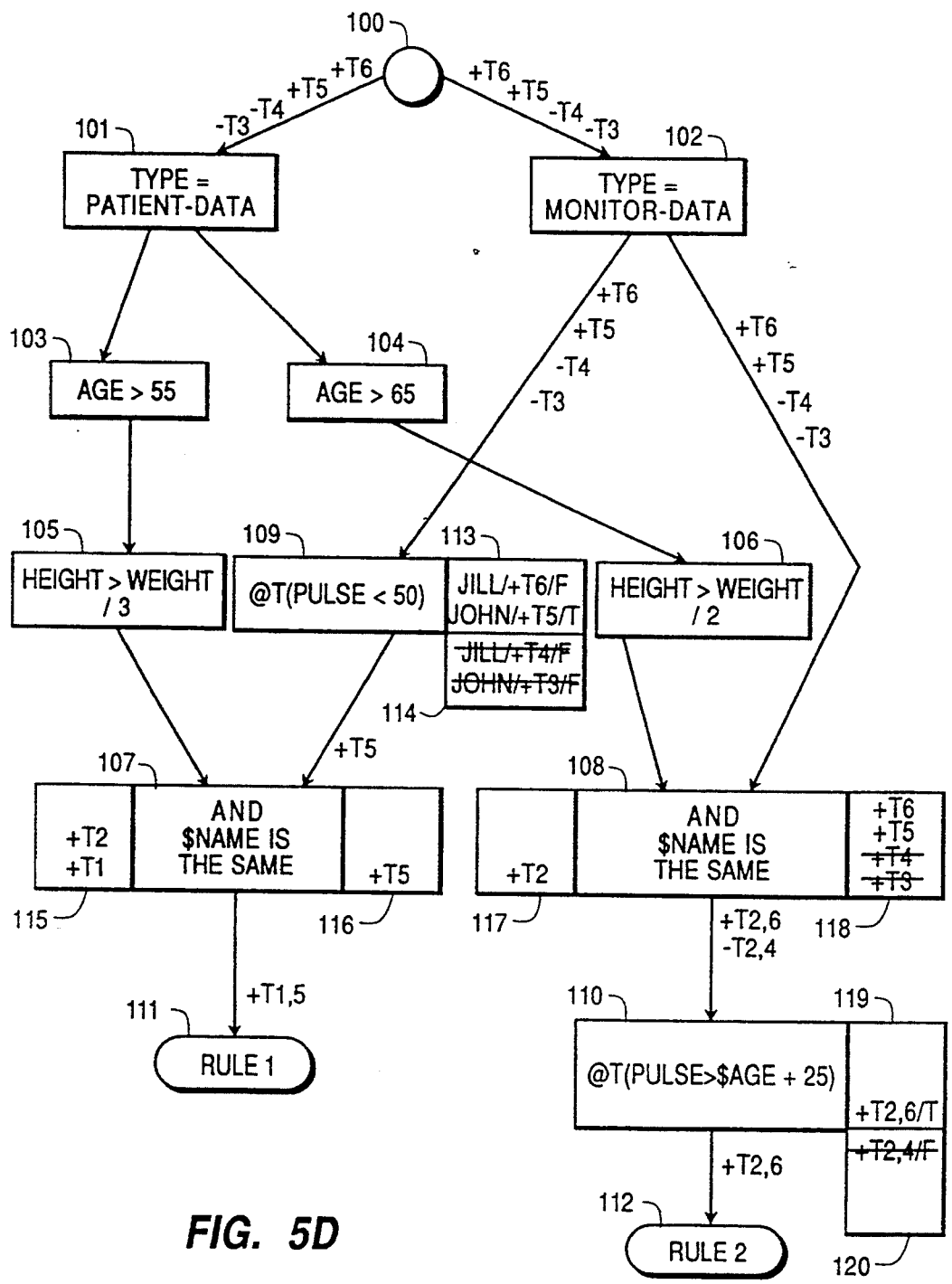

The final state of RETE-net 32 after the processing of data elements five, +T5, and six, +T6, is shown in FIG. 5D. These data elements represent data from the pulse meter attached to patients John and Jill, respectively, and are represented as follows:

(monitor-data  Name John  Pulse 40  Number 48  Date 10/10/89 . . . )
(monitor-data  Name Jill  Pulse 95  Number 49  Date 10/10/89 . . . )

Before these data elements are passed to RETE-net 32, two delete-tokens −T3 and −T4, are passed to start node 100 and subsequently passed to test nodes 101 and 102. These tokens pass the test of node 102 and are propagated to nodes 109 and 108. It is determined that the +T3/F and +T4/F are stored in new-value portion 113 of memory of node 109. These tokens are marked for deletion as indicated by the line through the tokens and moved to the old-value portion 114 of memory of node 109. No further propagation or processing of these tokens occurs in node 109 because the tokens do not represent a critical change.

Upon receiving −T3 and −T4 at its right input, node 108 searches its alpha memory 118 to determine if such tokens are stored there. Upon finding +T3 and +T4 stored in alpha memory 118, node 108 deletes these tokens. Next, node 108 logically ANDs −T3 with all of the tokens stored in beta memory 117 and finds no match. Node 108 repeats this procedure for delete token −T4 and finds a match with token +T2. Node 108 then generates and propagates a complex token representative of matching pair of tokens, −T2,4, to node 110.

Upon receiving the complex token, node 110 searches new-value portion 119 of its memory to see if there are any corresponding complex token stored therein. Upon finding the token +T2,4/F, node 110 marks the token for deletion and moves it to old-value portion 120 of its memory. No further propagation or processing of the complex token occurs in node 110 because the token does not represent a critical change.

Start node 100 passes the tokens +T5 and +T6, representative of data element five and six respectively, to test node 101 where the tokens fail node 101's test. Start node 100 then passes +T5 and +T6 to test node 102 where the tokens pass the test and are subsequently passed to @T node 109 and the right input of AND join node 108. Upon receiving +T5 and +T6, the @T node 109 computes the condition for these tokens. The condition of the token +T5 is true and the condition of the +T6 token is false. These tokens are then stored in the new-value portion 113 of node 109 memory.

Since the condition of +T5 is true, the next step performed by node 109 is to use patient name John as an index to locate tokens representative of pulse rate data for patient John stored in the old-value portion 114 of node 109 memory. Once such token is found, +T3/F, node 109 then compares the condition of the found token to the condition of +T5. By comparing the conditions of the token stored in the old-value portion 114 of memory, i.e., +T3/F, and the condition of the new token +T5/T, node 109 determines that this token represents a change from a noncritical state to a critical state for patient John's pulse rate. Thus, node 109 deletes the token found in old-value portion 114 of memory and passes the token +T5 to the right input of AND join node 107.

Upon receiving +T5, AND join node 107 first stores +T5 in its alpha memory 116. Next, node 107 compares the patient name associated with token +T5 to patient name associated with each token stored in beta memory 115 by performing logical AND operations. By performing this operation, it determines that there is a match between token +T1 and token +T5. Node 107 then generates and passes a complex token, +T1,5, representative of the matching pair to terminal node 111 indicating that Rule 1 has been satisfied for the patient John. This Rule is now in condition to be fired by inference engine 12. The firing of Rule 1 would result in starting intravenous saline, stopping dialysis and notifying an emergency nurse. This complex token remains in terminal node 111 until the rule is fired. When the rule is fired, the pointer to the complex token is discarded.

When the add tokens +T5 and +T6 are passed by node 102 to the right input of node 108, the first step performed by node 108 is to store +T5 and +T6 in alpha memory 118. The next step is to individually compare these newly received tokens to the tokens stored in beta memory 117, to determine if there is a match, i.e., does the same patient name appear in tokens stored in left-memory 117 as in +T5 or +T6. As a result, +T2 and +T6 are identified as a matching pair of tokens since both represent information for patient Jill. Thus, node 108 generates and passes a complex token, +T2,6, representative of the matching pair to @T node 110.

Upon receiving this complex token, node 110 computes the condition of the token and determines that it is true. The next step performed by node 110 is to store this token +T2,6 along with its associated condition in new-value portion 119 of node 110 memory as +T2,6/T. Since the condition is true, node 109 then compares the condition of any tokens stored in the old-value portion 120 of memory for the same patient to the condition of T2,6. By comparing the conditions of the token stored in the old-value portion 120 of memory, i.e., T2,4/F, and the condition of T2,6, it is determined that this new token represents a change from a noncritical state to a critical state for patient Jill's pulse rate. Thus, node 110 deletes the token stored in old-value portion 120 of node 110 memory and passes this complex token +T2,6 to terminal node 112 indicating that Rule 2 has been satisfied for the patient Jill. This rule is now in condition to be fired by inference engine 12. The firing of Rule 2 would result in the starting of oxygen and notifying an emergency nurse. The complex token remains in terminal node 112 until the rule is fired. After the rule is fired, the pointer to the complex token is discarded.

Figure 5E:
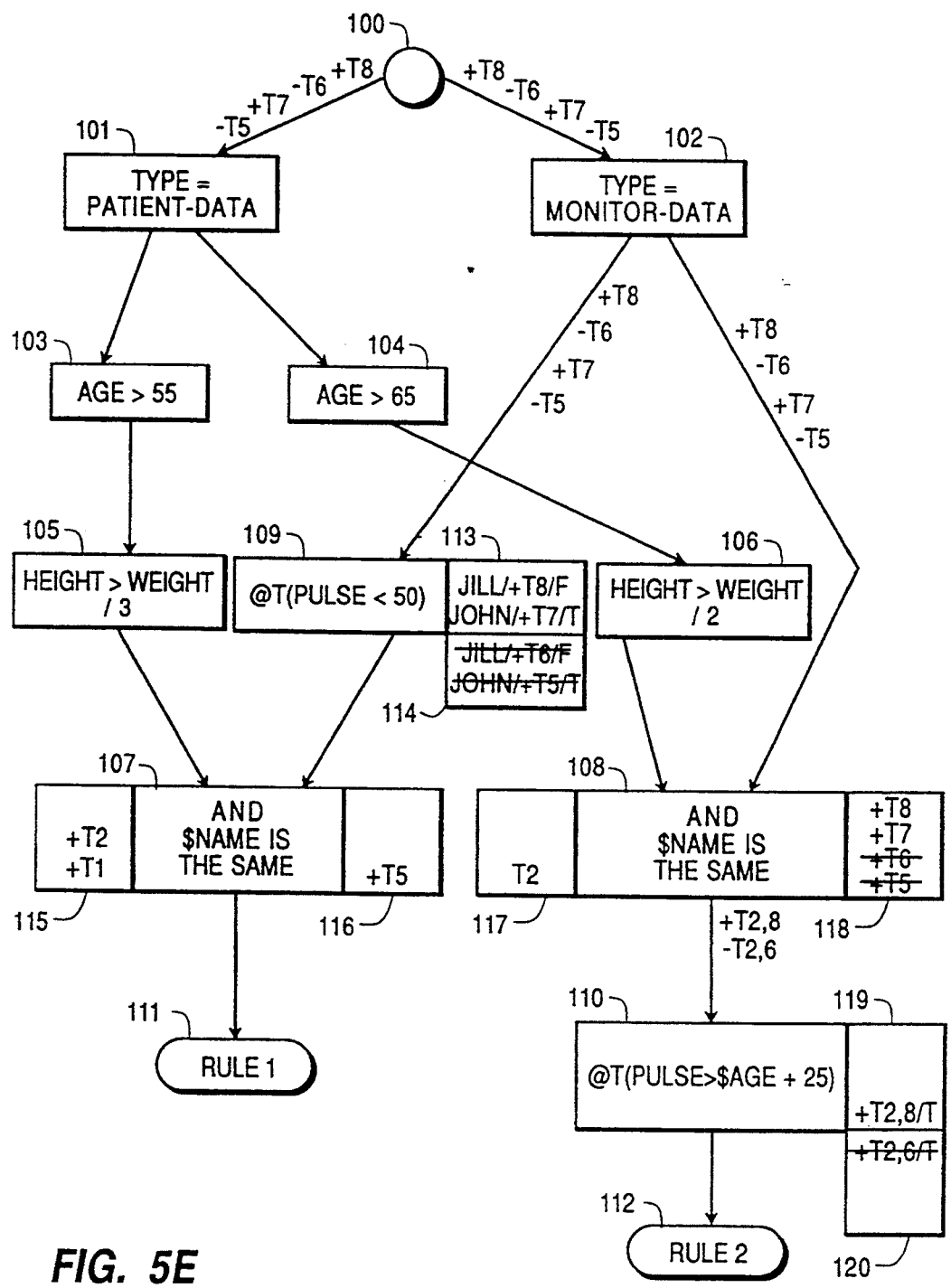

The final state of RETE-net 32 after processing data elements seven and eight and delete-tokens −T5 and −T6 is shown in FIG. 5E. The data elements seven, +T7, and eight, +T8, are representative of data from the pulse meter attached to the patients John and Jill, respectively, and are as follows:

+T7: (monitor-data Name John Pulse 42 Number 50 Date 10/10/89 ... )
+T8: (monitor-data Name Jill Pulse 100 Number 51 Date 10/10/89 ... )

The delete tokens −T5 and −T6 are individually passed to start node 100 and then passed to test node 101 where they fail node 101's test. Start node 100 then passes the tokens to test node 102 where they pass the test and are subsequently passed to node 109 and to the right-hand input of node 108. Tokens −T5 and −T6 are used by node 109 to identify the presence of the tokens +T5 and +T6 in the new-value portion 113 of node 109 memory. The +T5 and +T6 tokens in the new-value portion 113 of memory are marked for deletion and then moved to the old-value portion 114 of node 109 memory. No further propagation or processing of these tokens is performed in node 109.

Upon receiving the delete tokens −T5 and −T6, node 108 uses these tokens to identify the presence of the tokens +T5 and +T6 stored in alpha memory 118. The +T5 and +T6 tokens in alpha memory 118 are then deleted. Node 108 then performs a logical AND operation with the delete tokens and all tokens stored in beta memory 117. The result of the logical AND is that a new complex token, −T2,6, representative of the matching pair of tokens +T2 and −T6, is generated and passed to node 110.

Upon receiving this new complex token, node 110 uses the token to identify the presence of the token +T2,6 in the new-value portion 119 of memory. The token +T2,6 is then marked for deletion and moved to the old-value portion 120 of node 110 memory. No further propagation or processing of these tokens is performed.

The tokens +T7 and +T8 representative of data elements seven and eight are first individually passed to test node 101 where they fail the test of node 101. The tokens are then individually passed from start node 100 to test node 102 where they pass the test and are subsequently passed to node 109 and the right input of node 108. Upon receiving these two new add-tokens, node 109 calculates the condition for the tokens and determines that the condition for +T7 is true and the condition for +T8 is false. Node 109 stores these tokens in the new-value portion 113 of memory along with their associated condition. Since the token +T7 satisfies the condition of node 109, i.e., the pulse rate of John is less than 150, a comparison is made with the tokens stored in the old-value portion 114 of memory to determine if +T7 represents a change from a non-critical to a critical state. This is accomplished by comparing the condition of the token +T7 with the condition of tokens stored in the old-value portion 114 of memory representative of pulse rate data for patient John. The token +T5/T indicates that the last pulse rate data received for John was representative of a critical state. No further processing or propagation of the +T7/T token occurs since +T7/T does not constitute a change in state from +T5/T. The token +T5/T is deleted from the old-value portion 114 of node 109 memory and all subsequent AND nodes.

A similar situation occurs as node 108 and node 110 process add tokens +T7 and +T8. Upon receiving the tokens, node 108 first stores the tokens in alpha memory 118. Next, node 108 performs a comparison of these two tokens to the tokens stored in beta memory 117 to determine if a match of the tokens occurs. By performing an AND operation, it is determined that there is a matching pair of tokens +T2 and +T8, which result in the generation and passing of a new complex token, +T2,8, to node 110.

Node 110 calculates the condition of +T2,8 and determines that it represents a pulse rate for patient Jill that is greater than Jill's age plus 25. The token is stored in new-value portion 119 of node 110 memory along with its associated condition. Since the token satisfies the condition of node 110, a comparison must then be made to determine if the complex token represents the change from a non-critical state to a critical state. This is accomplished by comparing the condition of the complex token with the condition of tokens stored in the old-value portion 120 of memory representative of pulse rate data of patient Jill. The token +T2,6/T indicates that the last pulse rate data received for Jill was representative of a critical state. Thus, no further propagation or processing of +T2,8/T occurs since the token does not constitute a change in state from +T2,6/T. The token +T2,6/T is deleted from old-value portion 120 of node 110 memory.

Figure 5F:
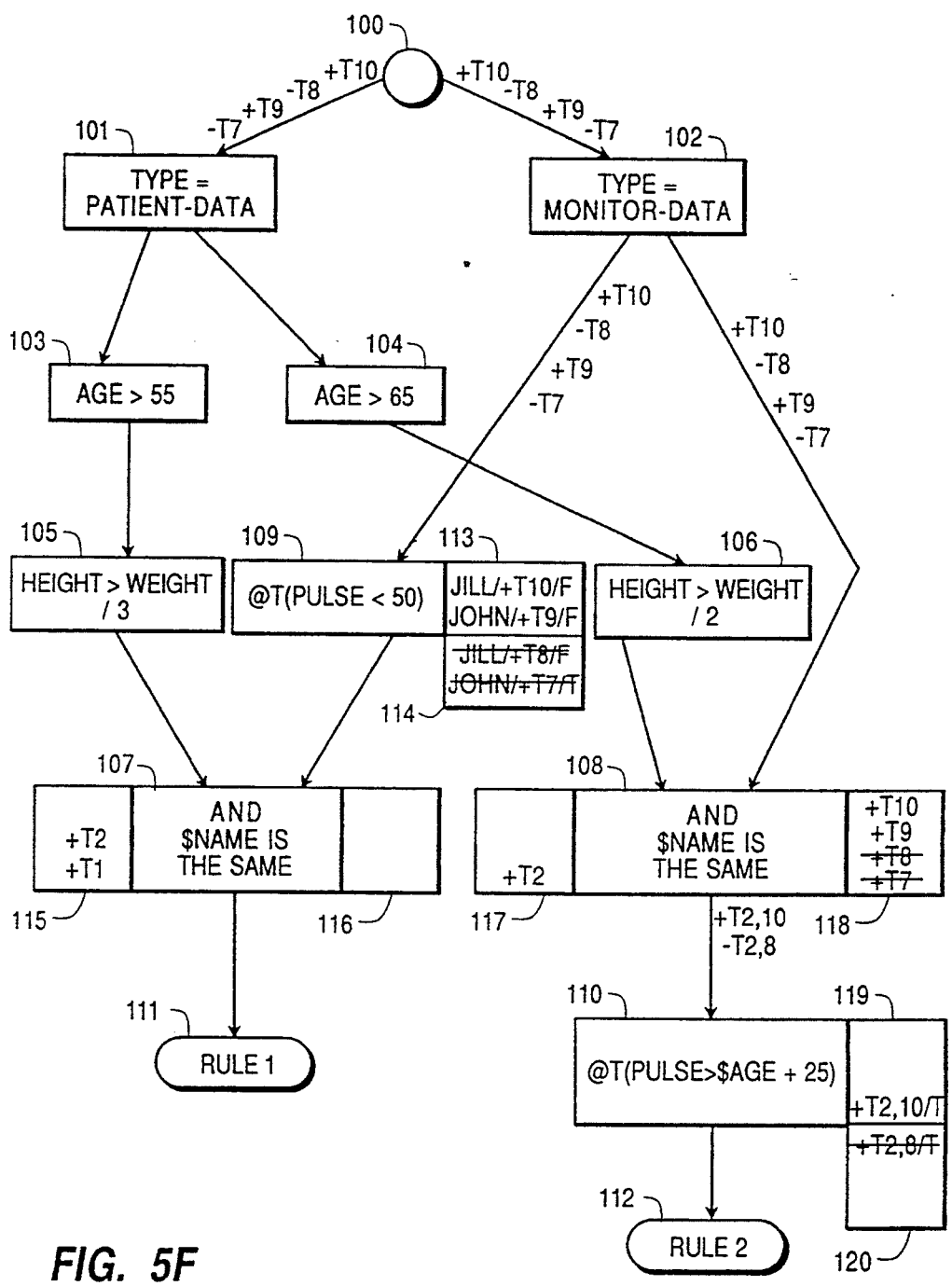

FIG. 5F illustrates the state of RETE-net 32 after processing data elements nine and ten and delete-tokens −T7 and −T8. The delete tokens propagate through RETE-net 32 as described above and are used to identify the presence of corresponding add-tokens stored in a node's memory and mark the add-tokens for deletion. The data elements nine, +T9, and ten, +T10, are again representative of data from the pulse meter attached to the patients John and Jill, respectively, and are as follows:

+T9: (monitor-data  Name John  Pulse 55  Number 52  Date 10/10/89 ... )
+T10: (monitor-data  Name Jill  Pulse 100  Number 53  Date 10/10/89 ... )

The tokens +T9 and +T10 are individually passed to test node 101 where they fail the test of node 101. The tokens are then individually passed from start node 100 to test node 102 where they pass the test and are subsequently passed to node 109 and the right-hand input of node 108. Upon receiving these tokens, node 109 calculates the condition for the tokens and determines that the conditions for +T9 and +T10 are false. Node 109 stores these tokens in the new-value portion 113 of memory along with their associated conditions and deletes the tokens representative of John and Jill's pulse rate in the old-value portion 114 of node 109 memory. Since neither token satisfies the condition of node 109, i.e., the pulse rate of a patient is less than 50, no further comparison or propagation of tokens takes place. Furthermore, +T9 indicates a change in John's pulse rate from a critical state to a noncritical state. The action started by the change in John's pulse rate from a noncritical to a critical state, i.e., starting intravenous saline and stopping dialysis, may be reversed by providing this state change to satisfy another rule (not shown) in RETE-net 32. Such rule may, for example, be satisfied when John's pulse rate is greater than 50 beats/minute.

Upon receiving the tokens, node 108 first stores the tokens in alpha memory 118. Next, node 108 performs a comparison of these two tokens to the tokens stored in beta memory 117 to determine if a match of the tokens occurs. By performing an AND operation, it is determined that there is a matching pair of tokens, +T2 and +T10, which result in the generation and passing of a new complex token, +T2,10, to node 110.

Upon receiving the complex token, node 110 calculates the condition of +T2,10 and determines that it is representative of a pulse rate for patient Jill that is greater than Jill's age plus 25. The token is stored in new-value portion 119 of node 110 memory along with its associated condition. Since the token satisfies the condition of node 110, a comparison must then be made to determine if the complex token represents the change from a non-critical state to a critical state by comparing the condition of the complex token with the condition of tokens stored in the old-value portion 120 of node 110 memory representative of pulse rate data patient Jill. The token +T2,8/T indicates that the last pulse rate data received for Jill was also representative of a critical state. Thus, no further propagation or processing of +T2,10/T occurs since the token does not constitute a change in state from +T2,8/T. The token +T2,8/T is deleted from old-value portion 120 of node 110 memory.

Figure 5G:
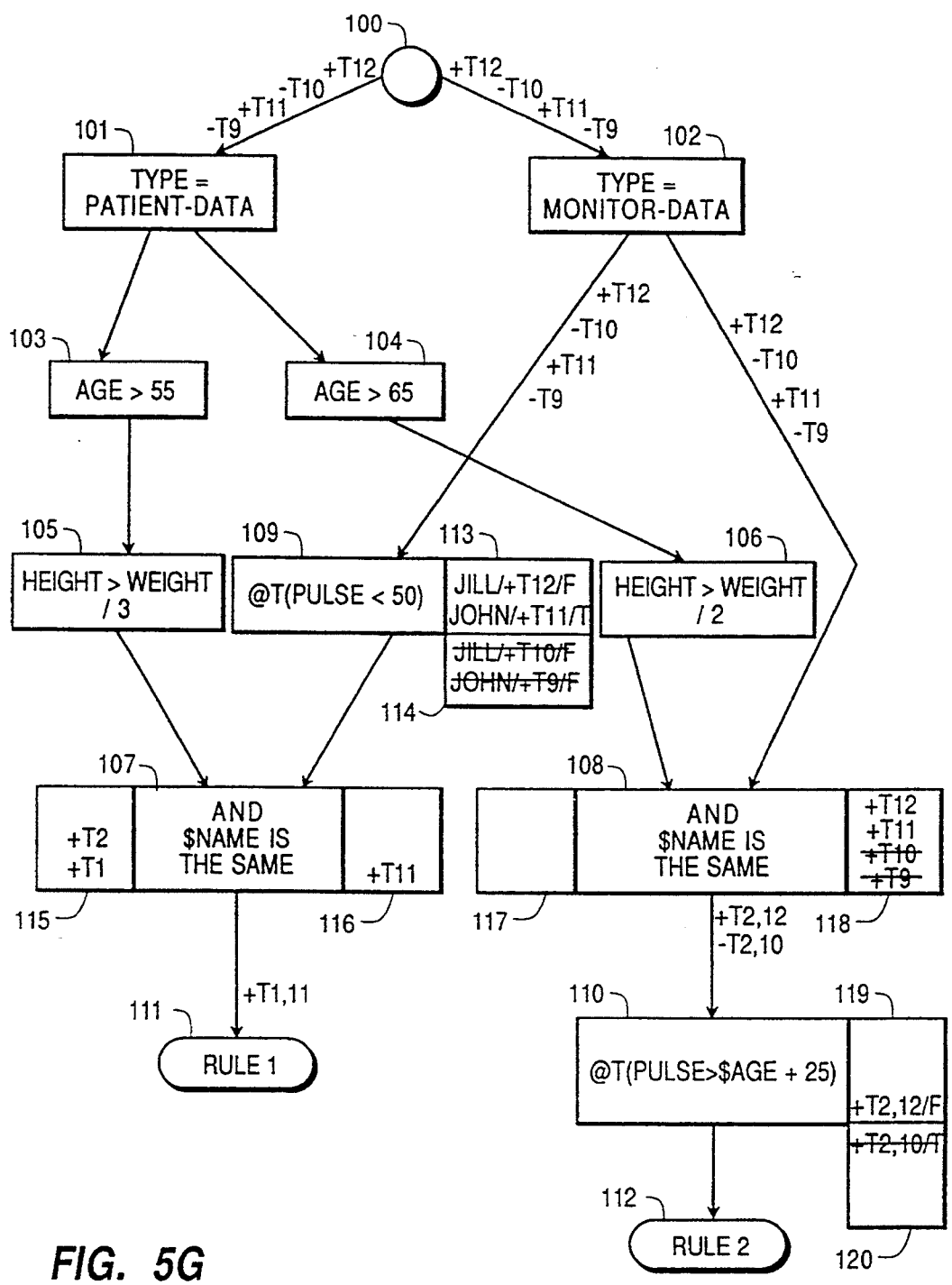

Referring now to FIG. 5G, there is illustrated the state of RETE-net 32 after processing data elements eleven and twelve and delete tokens −T9 and −T10. The delete tokens propagate through RETE-net 32 as described above and are used to identify the presence of corresponding add-tokens stored in a node's memory and mark the add-tokens for deletion. As in the previous figures, the data elements eleven, +T11, and twelve, +T12, represent data from the pulse meter attached to the patients John and Jill, respectively, and are as follows:

+T11: (monitor-data  Name John  Pulse 45  Number 54  Date 10/10/89 ... )
+T12: (monitor-data  Name Jill  Pulse 90  Number 55  Date 10/10/89 ... )

Start node 100 individually passes +T11 and +T12 to test node 101 where the tokens fail node 101's test. Start node 100 then individually passes +T11 and +T12 to test node 102 where the tokens pass the test and are subsequently passed to @T node 109 and the right input of AND join node 108. Upon receiving +T11 and +T12, the @T node 109 computes the condition for these tokens. The condition of the token +T11 is true and the condition of the +T6 token is false. These tokens are then stored in the new-value portion 113 of node 109 memory along with their associated conditions.

Since the condition of +T11 is true, the next step performed by node 109 is to compare this token to tokens stored in the old-value portion 114 of memory of node 109. By comparing the conditions of the tokens representative of pulse data for patient John stored in the old-value portion 114 of memory and the condition of the new token +T11, node 109 determines that this token represents a change to a critical state for patient John's pulse rate. Thus, node 109 passes the token +T11 to the right input of AND join node 107.

Upon receiving this token, AND join node 107 first stores +T11 in its alpha memory 116. Next, node 107 compares +T11 to each token stored in beta memory 115 by performing a logical AND function. By performing this operation, it determines that there is a match between token +T1 and token +T11. Node 107 then generates and passes a complex token, +T1,11, representative of the matching pair to terminal node 111 indicating that Rule 1 has again been satisfied for the patient John. This Rule is now in condition to be fired by inference engine 12. The firing of Rule 1 would result in starting intravenous saline, stopping dialysis and notifying an emergency nurse. This complex token remains in terminal node 111 until the rule is fired. When the rule is fired, the pointer to the complex token is discarded.

When the add tokens +T11 and +T12 are individually passed by node 102 to the right input of node 108, the first step performed by node 108 is to store +T11 and +T12 in alpha memory 118. The next step is to individually compare these newly received tokens to the tokens stored in beta memory 117, to determine if there is a match by performing a logical AND operation. As a result, +T2 and +T12 are identified as a matching pair of tokens. Thus, node 108 generates and passes a complex token, +T2,12, representative of the matching pair of tokens to @T node 110.

Upon receiving this complex token, node 110 computes the condition of the token and determines that it is false. The next step performed by node 110 is to store this token +T2,12 along with its associated condition in new-value portion 119 of memory as +T2,12/F. Since the token represents a change from a critical to a noncritical state, the complex token is not compared to any stored tokens or propagated to successor nodes.

Based upon the foregoing, it is clear that @T nodes 109 and 110 respond only to critical changes in data whereas a traditional join node in a RETE-net would respond to all data changes that satisfied the conditions expressed by the join node. This is demonstrated in FIGS. 5D–5E where node 109 only propagated a token, +T5, in FIG. 5D where the first noncritical to critical change in pulse rate of patient John (from 70 beats/minute to 40 beats/minute) occurred. The token passed in FIG. 5E representative of John's pulse rate was also representative of a critical value, i.e., 42 beats/minute. The node 109, however, did not propagate a token representative of the new pulse rate data because the new data did not represent a noncritical to a critical change. Node 109 implements this feature by comparing the new values of pulse rate data for a patient to old values stored in the old-value portion 114 of memory. Unless the new values represent a critical change, i.e., the condition of the new token is true and the condition of tokens stored in the old-value portion 114 are false, no token is propagated to successor nodes.

The above described embodiment of the invention is meant to be representative only, as certain changes may be made therein without departing from the clear teachings of the invention. Accordingly, reference should be made to the following claims which alone define the invention.

What is claimed is:

1. An expert system for evaluating an expression comprising a plurality of ordered conditions, each condition in the expression being linked and related to the next condition in the order by one of a preselected set of logical operators, the evaluation of the expression being based upon values of data elements presented to the expert system the expert system comprising:

(a) a plurality of nodes, each of the nodes representing one of the conditions of the expression, the plurality of nodes being coupled in such a manner to represent the order and logical relationships of the conditions in the expression;

(b) a processor coupled to the plurality of nodes for accepting as input a series of the values of data elements, for passing the values of data elements to the nodes of the expert system for utilizing each node to test the condition it represents as a success or failure based on the values of data elements, and pass information on successful tests to other related nodes, and for evaluating the expression based on the results of the node tests;

(c) at least one of the plurality of nodes being coupled to a memory for storing the results of condition testing in that node; and (d) the at least one of the plurality of nodes having its condition satisfied on the successful completion of two tests, the first test requiring that a value of data elements satisfies the condition represented by the at least one of the plurality of nodes, the second test requiring that the value of a previous one of the data elements stored in the memory did not satisfy the condition of the expression.

2. The expert system according to claim 1 wherein the at least one of the plurality of nodes is arranged to respond only upon satisfaction of the two tests.

3. An expert system for evaluating an expression comprising a plurality of ordered conditions, each condition in the expression being linked and related to the next condition in the order by one of a preselected set of logical operators, the evaluation of the expression being based upon values of data elements presented to the expert system the expert system comprising:

(a) a plurality of nodes, each of the nodes representing one of the conditions of the expression, the plurality of nodes being coupled in such a manner to represent the order and logical relationships of the conditions in the expression;

(b) a processor coupled to the plurality of nodes for accepting as input a series of the values of data elements, for passing the values of data elements to the nodes of the expert system for enabling each node to test the condition it represents as a success or failure based on the values of data elements and pass information on successful tests to other related nodes and for evaluating the expression based on the results of the node tests;

(c) at least one of the plurality of nodes being coupled to a memory for storing the results of condition testing; and (d) the at least one of the plurality of nodes having its condition satisfied on the successful completion of two tests, the first test requiring that a value of data elements did not satisfy the condition of the expression represented by the at least one of the plurality of nodes, the second test requiring that the value of a previous one of the data elements did satisfy the condition of the expression.

4. In a reticular discrimination (RETE) network, a test node having an input arranged to accept a series of data inputs and an output, the test node representing a condition of the RETE network, the test node comprising:

(a) a testing mechanism coupled to the input to determine if a current data input satisfies the condition of the test node;

(b) a memory coupled to the input having a plurality of locations for storing data received by input and data concerning the result determined by the testing mechanism;

(c) a storing mechanism for storing the current data input together with an indicator of whether the current data input satisfied the condition of the test node in the memory;

(d) a comparator coupled to the testing mechanism and the memory for comparing the current data input with entries concerning the immediately previous data input in the series stored in the memory if the current data input satisfies the condition of the test node; and (e) a passing mechanism coupled to the memory and the comparator for passing a token representative of the current data input received when the condition of the test node is satisfied and the entry concerning the immediately previous data input stored in the did not satisfy the condition.

5. A method for responding to changes in values of data elements when evaluating an expression comprising a plurality of ordered conditions, each condition in the expression being linked and related to the next condition in the order by one of a pre-selected set of logical operators arranged in a network, the network comprising a test node coupled to a memory and having an input for accepting a series of the values of data elements, and an output, the evaluations of the expression being based upon values of data elements presented to the network, the method comprising the steps of:

(a) selecting as a first token a first one of the values of data elements;

(b) presenting the first token to the input of the test node;

(c) determining whether the first token satisfies the condition of the network represented by the test node;

(d) storing as an entry in the memory information contained in the token with an indicator of whether the first token satisfies the condition of the test node;

(e) selecting as a second token a second one of the values of data elements;

(f) presenting the second token to the input of the node;

(g) determining whether the second token satisfies the condition of the test node and creating an indicator of whether the data in the second token satisfies the condition of the test node;

(h) if the second token satisfies the condition of the network, searching the memory for the entry;

(i) comparing the indicator of the memory entry to the indicator of the second token to determine if the second token has satisfied the condition of the node where the memory entry has failed; and (j) if the comparison step is true, propagating the token from the output of the node.

6. A method for responding to changes in values of data elements when evaluating an expression comprising a plurality of ordered conditions each condition in the expression being linked and related to the next condition in the order by one of a pre-selected set of logical operators arranged in a network, the network comprising a test node coupled to a memory having an input, and an output, the evaluation of the expression being based upon values of data elements presented to the network, the method comprising the steps of:

(a) selecting as a first token a first one of the values of data elements;

(b) the first token to the input of the test node;

(c) determining whether the first token does not satisfy the condition of the test nods;

(d) storing the first token in the memory with an indicator of whether the token does satisfy the test node;

(e) selecting as a second token a second one of the values of data elements;

(f) presenting the second token to the input of the test node and determining whether the data values in the second token satisfy the condition of the test node, creating an indicator of whether the second token satisfies the condition;

(g) if the second token does not satisfy the condition of the test node searching the memory for the entry;

(h) comparing the indicator of the second token to the indicator of the memory entry to determine if the second token represents a change to a predetermined state by determining whether the second token does not satisfy the condition where the memory entry indicates success; and (i) if the comparison Step is true and the token represents a change to a predetermined state, propagating the token from the output of the node.

7. The method according to claim 6 wherein the first and second tokens are add-tokens.

8. The method according to claim 7 comprising the further steps of:

(a) dividing the memory into a new-value and an old-value portion;

(b) performing the storing step (d) of claim 8, wherein information concerning the first token is stored in the new-value section of the memory;

(c) before steps (e)–(i) of claim 8, selecting a delete token containing information to cancel the effects of the first token;

(d) before steps (e)–(i) of claim 8, presenting the delete token to the test node;

(e) before steps (e)–(i) of claim 8, searching for the first token in the new value portion of the memory;

(f) marking the first token entry in the new-value portion for deletion;

(g) storing the first token entry in the old-value portion of memory;

(h) performing the step of searching the memory of claim 8, wherein the old-value portion of memory is searched for a token entry; and (i) storing the second add-token in the new-value portion of memory.

9. An expert system for evaluating an expression comprising a plurality of ordered conditions, each condition in the expression being linked and related to the next condition in the order by one of a preselected set of logical operators, the evaluation of the expression being based upon values of data elements presented to expert system, the expert system comprising:

(a) a memory device having a plurality of data elements stored therein;

(b) a plurality of nodes each representing one of the conditions comprising the expression, the plurality of nodes being coupled in such a manner as to represent the order and logical relationships of the conditions in the expression;

(c) a processor coupled to the memory device and the plurality of nodes, the processor passing values of the data elements stored in the memory device to the network and evaluating the expression for each one of the values of data elements passed through the plurality of nodes in the network;

(d) at least one of the plurality of nodes having a memory including a new-value portion and an old-value portion, the at least one of the plurality of nodes being arranged to respond only upon satisfaction of two tests, the first test requiring that a value of data elements satisfies the condition of the expression represented by the at least one of the plurality of nodes, the second test requires that the value of a previous one of the data elements stored in the old-value portion of memory did not satisfy the condition of the expression represented by the at least one of the plurality of nodes.

* * * * *